US011069027B1

(12) United States Patent
Jain et al.

(10) Patent No.: US 11,069,027 B1
(45) Date of Patent: Jul. 20, 2021

(54) GLYPH TRANSFORMATIONS AS EDITABLE TEXT

(71) Applicant: Adobe Inc., San Jose, CA (US)

(72) Inventors: Arushi Jain, Ashok Vihar (IN); Praveen Kumar Dhanuka, Howrah (IN); Ashish Jain, Ashok Vihar (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/749,563

(22) Filed: Jan. 22, 2020

(51) Int. Cl.
*G06T 3/00* (2006.01)
*G06T 3/40* (2006.01)
*G06T 3/60* (2006.01)
*G06T 11/20* (2006.01)

(52) U.S. Cl.
CPC .............. *G06T 3/0056* (2013.01); *G06T 3/40* (2013.01); *G06T 3/60* (2013.01); *G06T 11/20* (2013.01); *G06T 2200/24* (2013.01); *G06T 2210/12* (2013.01)

(58) Field of Classification Search
CPC .......................... G06T 3/0056; G06T 2210/12
See application file for complete search history.

(56) References Cited

U.S. PATENT DOCUMENTS

| | | | | |
|---|---|---|---|---|
| 9,235,757 B1* | 1/2016 | Liu | .......................... | G06K 9/325 |
| 10,157,331 B1* | 12/2018 | Tang | ..................... | G06K 9/6231 |
| 2010/0315431 A1* | 12/2010 | Smith | ..................... | G06T 11/20 |
| | | | | 345/619 |
| 2012/0001922 A1* | 1/2012 | Escher | .................. | G06F 40/109 |
| | | | | 345/467 |
| 2012/0198545 A1* | 8/2012 | Keenan | ..................... | G09G 5/14 |
| | | | | 726/18 |
| 2015/0026618 A1* | 1/2015 | Stone | .................. | G06F 3/04815 |
| | | | | 715/769 |
| 2015/0301721 A1* | 10/2015 | Clark | ..................... | H04L 67/10 |
| | | | | 715/780 |
| 2017/0220859 A1* | 8/2017 | Grams | ...................... | G06T 7/13 |
| 2017/0337902 A1* | 11/2017 | Nicholl | .................. | G06T 11/203 |
| 2019/0137283 A1* | 5/2019 | Kuo | ......................... | G06F 16/29 |

\* cited by examiner

*Primary Examiner* — Phi Hoang
(74) *Attorney, Agent, or Firm* — FIG. 1 Patents

(57) ABSTRACT

In implementations of precise glyph transformations as editable text, a computing device implements a transformation system to generate bounding boxes for a first glyph and a second glyph of multiple glyphs. The bounding boxes are concatenated as a multiple glyph bounding box for the multiple glyphs. The transformation system receives a user input defining a transformation of the multiple glyph bounding box relative to an object, and the system maps the transformation of the multiple glyph bounding box to the bounding boxes for the first glyph and the second glyph. The multiple glyphs are rendered in a user interface as the editable text having the transformation based on the mapping.

20 Claims, 17 Drawing Sheets

1500

GLYPH TRANSFORMATIONS AS EDITABLE TEXT

BACKGROUND

Conventional systems for creating and/or editing digital content enable users of such systems to modify default positions of glyphs included as part of the digital content. These systems can provide this functionality based on inputs received from user interactions with an input device such as manipulations of the input device to select a glyph and "drag" the glyph within the digital content. Some conventional systems generate guides to facilitate precise positioning or transforming of glyphs relative to objects within the digital content. These systems utilize outlines of the glyphs which are compared to outlines of other objects to generate the guides. Once generated, the guides are rendered in a user interface to indicate that the outlines of the glyphs are oriented in a particular manner relative to the outlines of the objects.

One shortcoming of conventional systems that compare glyph outlines with other outlines to generate the guides is that these systems need glyphs to be converted into outlines for performing the comparisons. The glyphs, once converted into outlines, are no longer editable as text. As a result, functionality available as editable text such as functionality of TrueType and OpenType fonts is lost as soon as the glyphs are converted into outlines.

Although conventional systems facilitate repositioning of glyphs without the benefit of the guides, these systems only support repositioning of glyphs one glyph at a time. Thus, in order to reposition three glyphs relative to an object as part of editing digital content, each of the three glyphs must be individually repositioned relative to the object. This manual process often requires several attempts before a user is satisfied with a repositioning of the glyphs relative to the object because the guides are not available and because the glyphs can only be repositioned one at a time which increases the likelihood of user error.

SUMMARY

Systems and techniques are described for glyph transformations as editable text. In an example, a computing device implements a transformation system to generate bounding boxes for a first glyph and a second glyph of multiple glyphs. The transformation system leverages the bounding boxes for the first and second glyphs to generate a multiple glyph bounding box for the multiple glyphs together by concatenating the bounding boxes of the first and second glyphs. In this way, the transformation system generates the multiple glyph bounding box to address both the first and second glyphs together, which is not possible in conventional techniques.

In one example, a user input is received defining a transformation of the multiple glyph bounding box relative to an object. The transformation system determines a mapping of the transformation of the multiple glyph bounding box to the bounding boxes for the first glyph and the second glyph. For example, the transformation system determines the mapping without converting the multiple glyphs into outlines, thus improving computational efficiency of the computing device. The multiple glyphs are rendered in a user interface as editable text having the transformation based on the mapping without further user intervention, which is also not possible in conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
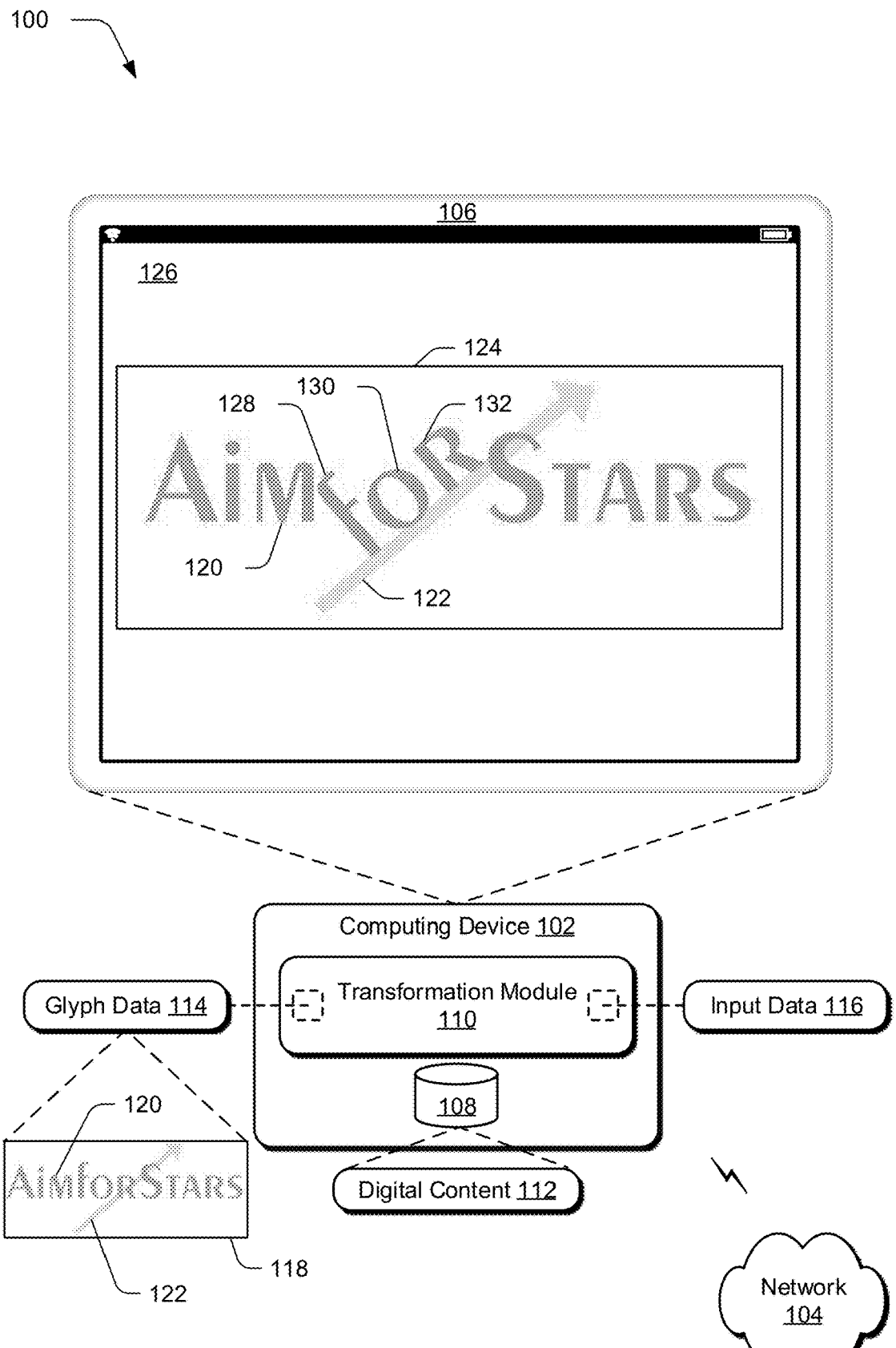
FIG. 1 is an illustration of an environment in an example implementation that is operable to employ digital systems and techniques for glyph transformations as editable text as described herein.

Conventional systems for creating and editing digital content enable users of such systems to modify default positions of glyphs included as part of the digital content through interaction with an input device to select a glyph and "drag" the glyph within the digital content. However, these conventional systems are limited to transforming or repositioning of glyphs one glyph at a time. As a result, transforming multiple glyphs is burdensome and in practice is difficult to precisely align the repositioned glyphs as each glyph must be aligned individually, which is manually and computationally inefficient.

Although some conventional systems provide guides for repositioning objects included in the digital content, the glyphs are converted into outlines in order to use these guides. Although conversion of glyphs into outlines enables use of the guides, the converted glyphs are no longer editable as text. As a result, the editability of the converted glyphs as text is lost along with a variety of functionality available in editable text.

Systems and techniques are described for glyph transformations as editable text. In an example, a computing device implements a transformation system to generate bounding boxes for a first glyph and a second glyph of multiple glyphs. These bounding boxes may fully envelop outlines of the first and second glyphs and also precisely bound the outlines such that sides of the bounding boxes are tangent to extreme portions of the outlines.

The transformation system concatenates the bounding boxes for the first glyph and the second glyph together as a multiple glyph bounding box for the multiple glyphs. By concatenating the bounding boxes for the first and second glyphs, for instance, the transformation system generates the multiple glyph bounding box as having a right side equal to a right side of the rightmost bounding box for the first and second glyphs. Similarly, the multiple glyph bounding box is generated as having a left side equal to a left side of the leftmost bounding box for the first and second glyphs.

Extreme portions of the multiple glyph bounding box are used to identify potential alignments between the first and second glyphs and other objects. These potential alignments can be identified based on transformations of the first and second glyphs relative to the other objects and/or transformations of the other objects relative to the first and second glyphs. By using the multiple glyph bounding box to identify potential alignments, the transformation system can generate guides based on the potential alignments without converting the first and second glyphs into outlines.

For example, positions of corners of the multiple glyph bounding box are used to identify potential horizontal, vertical, center, and equal spacing alignments between the first and second glyphs and the other objects. Angle line data, e.g., due to a rotation of the multiple glyph bounding box, can be used to identify potential angle alignments between the first and second glyphs and the other objects. The transformation system renders indications as guides in a user interface based on the identified potential alignments.

A user input is received defining a transformation of the multiple glyph bounding box relative to any object of the other objects. This transformation can include a displacement, a scaling, a rotation, etc. The transformation system maps the transformation of the multiple glyph bounding box to the bounding boxes for the first glyph and the second glyph. The multiple glyphs are rendered in the user interface as editable text having the transformation based on the mapping.

The described systems improve conventional technology for creating and/or editing digital content by rendering guides for guiding transformations of a glyph without converting the glyph into an outline. This enables the glyph to be precisely transformed as editable text which is not possible using conventional systems. The described systems also enable precise transformations of a single glyph or multiple glyphs any of which can be transformed as editable text. By enabling multiple glyphs to be transformed as editable text, the described systems and techniques improve computational efficiency of computing devices by preserving computational resources used to reposition glyphs one glyph at a time using conventional systems.

Examples of functionality made possible by preserving editability of transformed glyphs as text which are not possible after converting a glyph into an outline include an ability to change fonts, font sizes, or any text characteristic used to render glyphs before and after transformation of the glyphs. For example, using the described systems, glyphs can be rendered using a first font, transformed as editable text, and then glyphs may be rendered using a second font having the transformation as editable text. As editable text, transformed glyphs can be modified to add or remove features such as boldface, italic, strikethrough, underline, etc. Additionally, all features and functionality of TrueType and OpenType fonts are available to editable text which are lost by converting glyphs into outline using conventional systems. Thus, the described systems improve operation of computing devices by significantly increasing functionality available to create and/or edit digital content including editable text.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a transformation module 110. The storage device 108 is illustrated to include digital content 112.

The transformation module 110 is illustrated as having, receiving, and/or transmitting glyph data 114 and input data 116. The glyph data 114 includes information usable by an application for creating and/or editing the digital content 112 to render glyphs and other objects as part of creation and/or editing of the digital content 112. For example, the glyph data 114 includes both general properties of glyphs such as font file data as well as data that is specific to glyphs included in the digital content 112 such as outline data describing the glyphs included in the digital content 112. The glyph data 114 also includes general properties of objects as well as data that is specific to objects included in the digital content 112, e.g., outline data describing the objects included in the digital content 112.

The glyph data 114 is illustrated to include an example 118 of glyphs 120 and an object 122. Thus, the glyph data 114 includes data that is general to the glyphs 120 such as font file data corresponding to a font used to render the glyphs 120 as well as data that is specific to the glyphs 120 as depicted in the example 118 such as outline data, font size data, horizontal scale data, vertical scale data, etc. As shown, the example 118 depicts 11 glyphs 120 and the object 122 is an arrow oriented at an angle relative to the glyphs 120.

The input data 116 includes information usable by the application for creating and/or editing the digital content 112 to render additions and modifications to glyphs and other objects as part of creation and/or editing of the digital content 112. An input device such as a stylus, a touchscreen, an electronic pen, or a mouse that receives data, e.g., from a user manipulation, can transmit the received data to the computing device 102 as part of the input data 116. As illustrated, the input data 116 includes a user input defining a transformation of the glyphs 120 relative to the object 122 depicted in the example 118. The transformation module 110 processes the glyph data 114 and the input data 116 to generate the glyphs 120 depicted in the example 118 having the transformation defined by the user input included as part of the input data 116. Once generated, the transformation module 110 can render transformed glyphs 124 in a user interface 126 of the display device 106.

In the illustrated example, the rendering of the transformed glyphs 124 depicts three glyphs 128, 130, 132 of the glyphs 120 depicted in the example 118 rotated relative to the object 122. In this example, the transformation defined in the input data 116 is a rotation of the three glyphs 128, 130, 132 relative to the object 122. The transformation module 110 generates the transformed glyphs 124 as editable text which can be edited, e.g., by an additional user input. In one example, the transformation module 110 generates the transformed glyphs 124 without converting the three glyphs 128, 130, 132 to outlines. In this manner, the computing device 102 can implement the transformation module 110 to precisely snap the three glyphs 128, 130, 132 to the object 122 as editable text.

Figure 2:
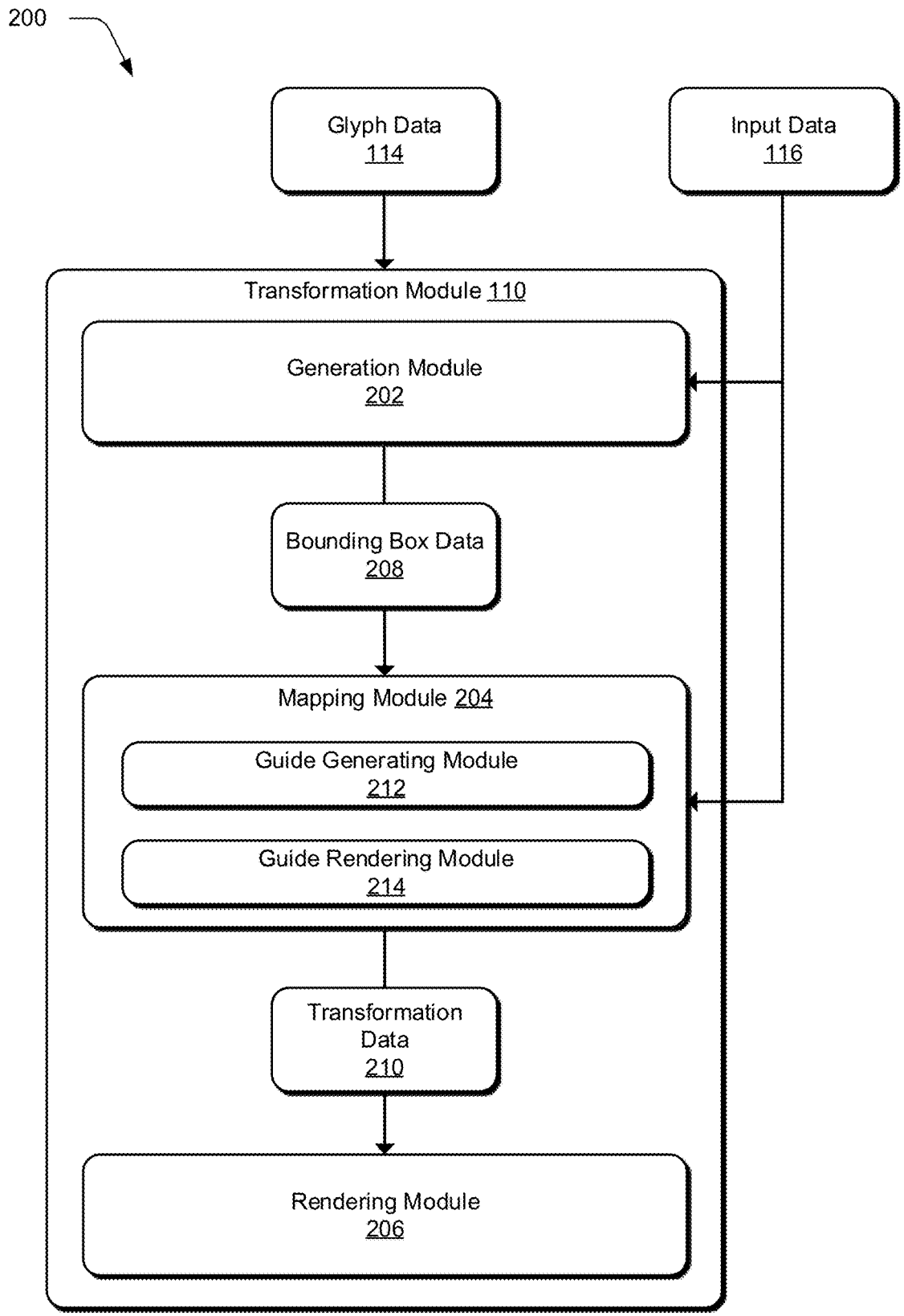
FIG. 2 depicts a system in an example implementation showing operation of a transformation module for transforming glyphs as editable text.
Figure 3:
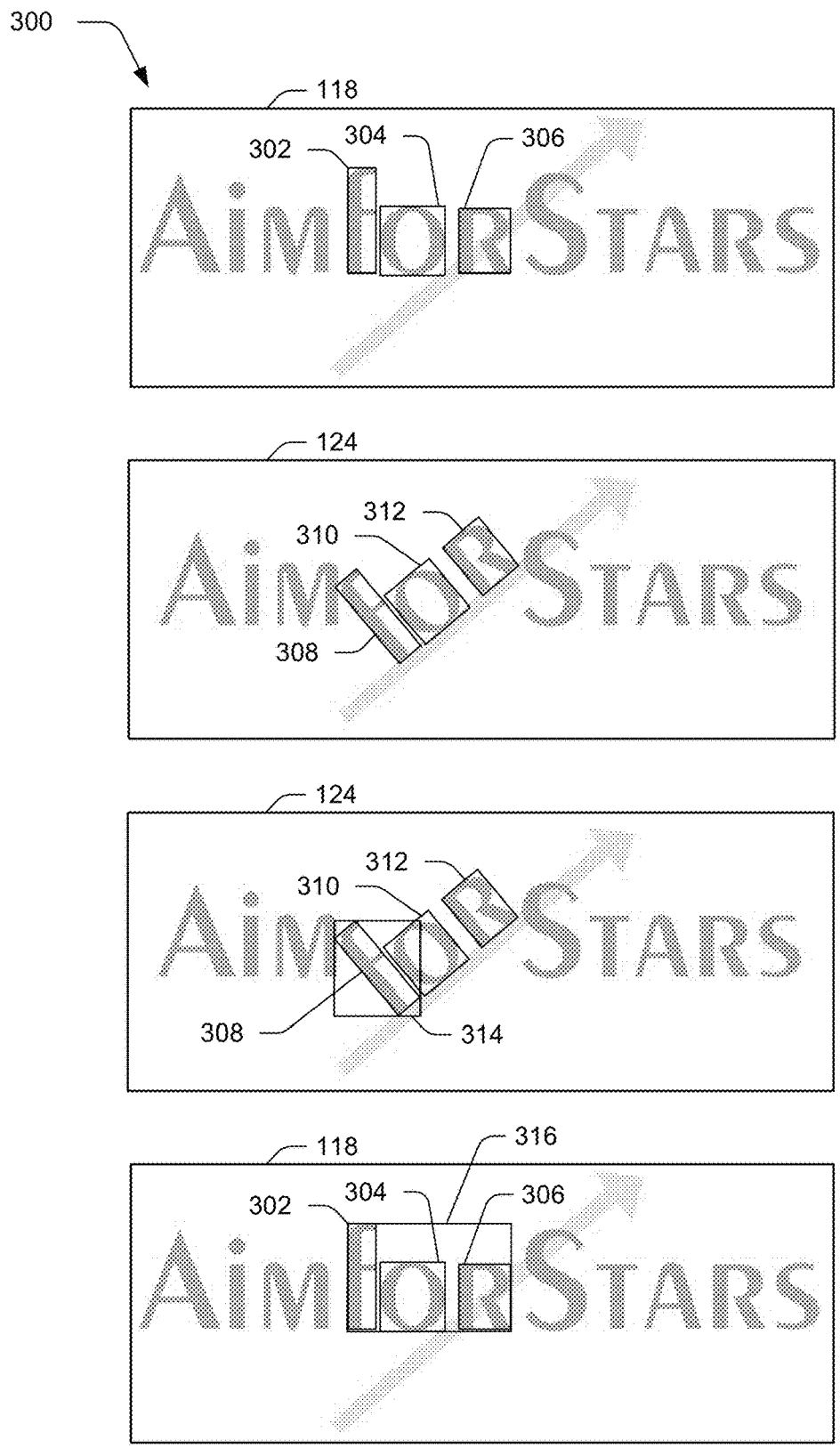
FIG. 3 is an illustration of representations of functionality described with respect to FIG. 2.

FIG. 2 depicts a system 200 in an example implementation showing operation of a transformation module 110. FIG. 3 is an illustration of representations 300 of functionality described with respect to FIG. 2. The transformation module 110 is illustrated to include a generation module 202, a mapping module 204, and a rendering module 206. The computing device 102 implements the transformation module 110 to receive the glyph data 114 and the input data 116. In the illustrated example, the generation module 202 receives the glyph data 114 and the input data 116 and processes the glyph data 114 and the input data 116 to generate bounding box data 208.

The generation module 202 generates the bounding box data 208 by accessing glyph identification data, font size data, horizontal scale data, vertical scale data, orientation data, and/or glyph outline data describing the glyphs 120 from the glyph data 114. The generation module 202 then generates a zero angled reference bounding box for each of the glyphs 120 included in the example 118 to fully envelop an outline corresponding to each of the glyphs 120. To do so, the generation module 202 generates the zero angled reference bounding boxes for the glyphs 120 as having heights and widths defined with respect to a reference origin, e.g., (0,0) in a font space. For example, the generation module 202 generates a particular zero angled reference bounding box for a particular glyph of the glyphs 120 to precisely bound the outline of the particular glyph such that sides of the particular zero angled reference bounding box are tangent to extreme portions of the particular glyph's outline. By precisely bounding the outline of the particular glyph, the particular zero angled bounding box is usable precisely transform the particular glyph.

In one example, the particular zero angled reference bounding box may differ from an em-box or em-square associated with the particular glyph of the glyphs 120 because the em-box or em-square may not necessarily fully envelop the outline of the particular glyph of the glyphs 120. In another example, the particular zero angled reference bounding box may differ from the em-box or em-square associated with the particular glyph because the em-box or em-square may fully envelop the outline of the particular glyph but with spacing between the sizes of the em-box or em-square and the extreme portions of the particular glyph's outline. The generation module 202 generates the bounding box data 208 to include data describing the zero angled reference bounding box for each of the glyphs 120 included in the example 118.

As shown in FIG. 3, the generation module 202 generates zero angled reference bounding boxes 302, 304, 306 for the glyphs 128, 130, 132, respectively. In this example, sides of the zero angled reference bounding box 302 are tangent to extreme portions of the glyph 128. The zero angled reference bounding box 302 also fully envelops an outline of the glyph 128.

The generation module 202 also generates a theta angled reference bounding box for each of the glyphs 120 included in the example 118, e.g., if any rotation transformation is applied to the glyphs 120 via the input data 116. To do so, the generation module 202 processes the input data 116 to extract any rotation applied to each glyph of the glyphs 120 depicted in the example 118. The generation module 202 generates the theta angled reference bounding boxes by applying rotations described by rotation data extracted from the input data 116 to the zero angled reference bounding boxes. Thus, a particular theta angled reference bounding box for the particular glyph is the same as the particular zero angled reference bounding box if the particular glyph is not rotated in the example 118. For example, if the particular glyph was rotated by 45 degrees in the example 118, then the particular theta angled reference bounding box would be rotated by 45 degrees relative to the particular zero angled reference bounding box. The generation module 202 generates the bounding box data 208 to include data describing the theta angled reference bounding box for each of the glyphs 120 included in the example 118.

As illustrated in FIG. 3, the generation module 202 generates theta angled reference bounding boxes 308, 310, 312 for the glyphs 128, 130, 132, respectively. In this example, sides of the theta angled reference bonding box 308 are tangent to the extreme portions of the glyph 128. The theta angled reference bounding box 308 also fully envelops the outline of the glyph 128.

The generation module 202 additionally generates a zero angled non-reference bounding box for each glyph of the glyphs 120 by processing the glyph data 114 to extract glyph outline information for the glyphs 120 as depicted in the example 118. The generation module 202 then generates the zero angled non-reference bounding boxes using the extracted glyph outline information based on orientations of the outlines of the glyphs 120 as depicted in the example 118. For example, the generation module 202 generates the bounding box data 208 to include data describing the zero angled non-reference bounding box for each of the glyphs 120 as depicted in the example 118.

As shown in FIG. 3, the generation module 202 generates a zero angled non-reference bounding box 314 for the glyph 128. In an example, sides of the zero angled non-reference bounding box 314 are tangent to portions of the theta angled reference bounding box 308. As illustrated, the zero angled non-reference bounding box 314 fully envelops the theta angled reference bounding box 308 for the glyph 128.

In one example, the generation module 202 generates a bounding box for multiple glyphs of the glyphs 120 by concatenating bounding boxes of individual glyphs of the multiple glyphs. To do so, the generation module 202 generates the bounding box for the multiple glyphs to fully envelop outlines corresponding to each of the multiple glyphs based on extremes of the individual bounding boxes of the glyphs of the multiple glyphs. For example, the generation module 202 generates a left side of the bounding box for the multiple glyphs as a left side of the bounding box of a leftmost individual glyph of the multiple glyphs. Similarly, the generation module 202 generates a right side of the bounding box for the multiple glyphs as a right side of the bounding box of a rightmost individual glyph of the multiple glyphs. The generation module 202 generates the bounding box data 208 to include data describing the zero angled non-reference bounding box for the multiple glyphs.

As illustrated in FIG. 3, the generation module 202 generates a multiple glyph bounding box 316 for multiple glyphs by concatenating the bounding boxes 302, 304, 306. For example, the generation module 202 generates the multiple glyph bounding box 316 as having a left side based on a left side of bounding box 302. In this example, the generation module 202 generates the multiple glyph bounding box 316 as having a right side based on a right side of bounding box 306. As shown, the generation module 202 generates the multiple glyph bounding box 316 as having a bottom side based on a bottom side of bounding box 304. In a similar way, the generation module 202 generates the multiple glyph bounding box 316 as having a top side based on a top side of bounding box 302. Thus, the generation module 202 generates the bounding box for multiple glyphs 316 to fully envelop the bounding boxes 302, 304, 306.

The mapping module 204 receives the bounding box data 208 and the input data 116 and the mapping module 204 processes the bounding box data 208 and the input data 116 to generate transformation data 210. In one example, the mapping module 204 includes a guide generating module 212 and a guide rendering module 214 which may be implemented to generate and render a guide, respectively, for guiding a transformation of the glyphs 120. As used herein the term "guide" refers to an indication such as a visual indication that a glyph is oriented in a particular manner relative to an object or that an object is oriented in a particular manner relative to a glyph in the user interface 126. For example, a guide can indicate that a glyph is precisely oriented or aligned relative to an object.

The mapping module 204 processes the input data 116 to map transformations, e.g., user inputs, to the glyphs 120 based on the bounding box data 208. For example, the mapping module 204 maps a horizontal displacement of a particular glyph of the glyphs 120 to kerning and the mapping module 204 maps a vertical displacement of the particular glyph into a baseline shift. In another example, the mapping module 204 maps a rotation of the particular glyph as a displacement angle from a center of the particular glyph. The mapping module 204 maps a horizontal scaling of the particular glyph as a scale percentage mapped onto a horizontal scale of the particular glyph. Similarly, the mapping module 204 maps a vertical scaling of the particular glyph as a scale percentage mapped onto a vertical scale of the particular glyph. The mapping module 204 maps a uniform scaling of the particular glyph as a scale percentage mapped onto the horizontal scale and the vertical scale of the particular glyph.

As the mapping module 204 is mapping transformations described in the input data 116 to the glyphs 120, the mapping module 204 also updates the zero angled non-reference bounding boxes of the glyphs 120 based on the mapped transformations. The guide generating module 212 uses the updated zero angled non-reference bounding boxes to identify potential alignments of the glyphs 120, e.g., with outlines of objects. The guide generating module 212 generates these potential alignments as guides and the guide rendering module 214 renders the guides in the user interface 126. In this way, the transformation module 110 renders the guides to guide transformations in substantially real time as data describing the transformations is received as part of the input data 116.

The mapping module 204 generates the transformation data 210 using the zero angled reference bounding boxes, the zero angled non-reference bounding boxes, and/or the theta angled reference bounding boxes to transform the glyphs 120 as editable text. The transformation data 210 describes these editable text transformations and the rendering module 206 receives the transformation data 210. The rendering module 206 processes the transformation data to render the transformed glyphs 124 as editable text.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

Figure 4:
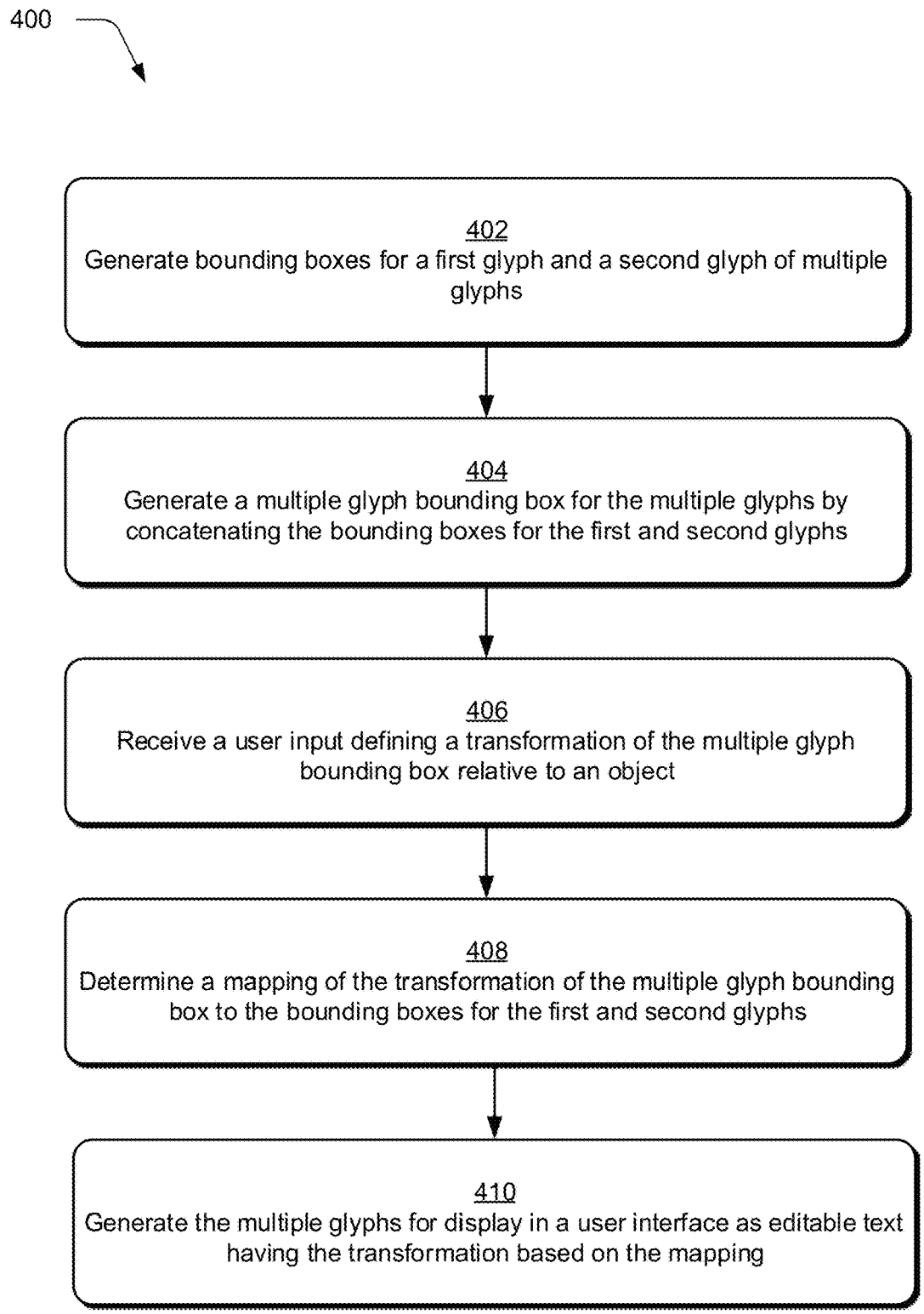
FIG. 4 is a flow diagram depicting a procedure in an example implementation in which a bounding box for multiple glyphs is generated by concatenating bounding boxes of a first glyph and a second glyph of the multiple glyphs, a user input defining a transformation of the multiple glyphs is received, and the multiple glyphs are generated for display in a user interface as editable text having the transformation.

FIG. 4 is a flow diagram depicting a procedure 400 in an example implementation in which a bounding box for multiple glyphs is generated by concatenating bounding boxes of a first glyph and a second glyph of the multiple glyphs, a user input defining a transformation of the multiple glyphs is received, and the multiple glyphs are generated for display in a user interface as editable text having the transformation. Bounding boxes for a first glyph and a second glyph of multiple glyphs are generated (block 402). For example, the transformation module 110 generates the bounding boxes for the first and second glyphs. In another example, the transformation module 110 can generate bounding boxes for all glyphs of multiple glyphs selected for transformation. A multiple glyph bounding box for the multiple glyphs is generated (block 404) by concatenating the bounding boxes for the first and second glyphs. The computing device 102 implements the transformation module 110 to generate the multiple glyph bounding box by concatenating the bounding boxes for the first and second glyphs in one example.

A user input defining a transformation of the multiple glyph bounding box relative to an object is received (block 406). In one example, the transformation module 110 receives the user input defining the transformation. A mapping of the transformation of the multiple glyph bounding box to the bounding boxes for the first and second glyphs is determined (block 408). The computing device 102 can implement the transformation module 110 to determine the mapping. The multiple glyphs are generated for display in a user interface (block 410) as editable text having the transformation based on the mapping. The transformation module 110 may generate the multiple glyphs for display in the user interface in an example.

Figure 5:
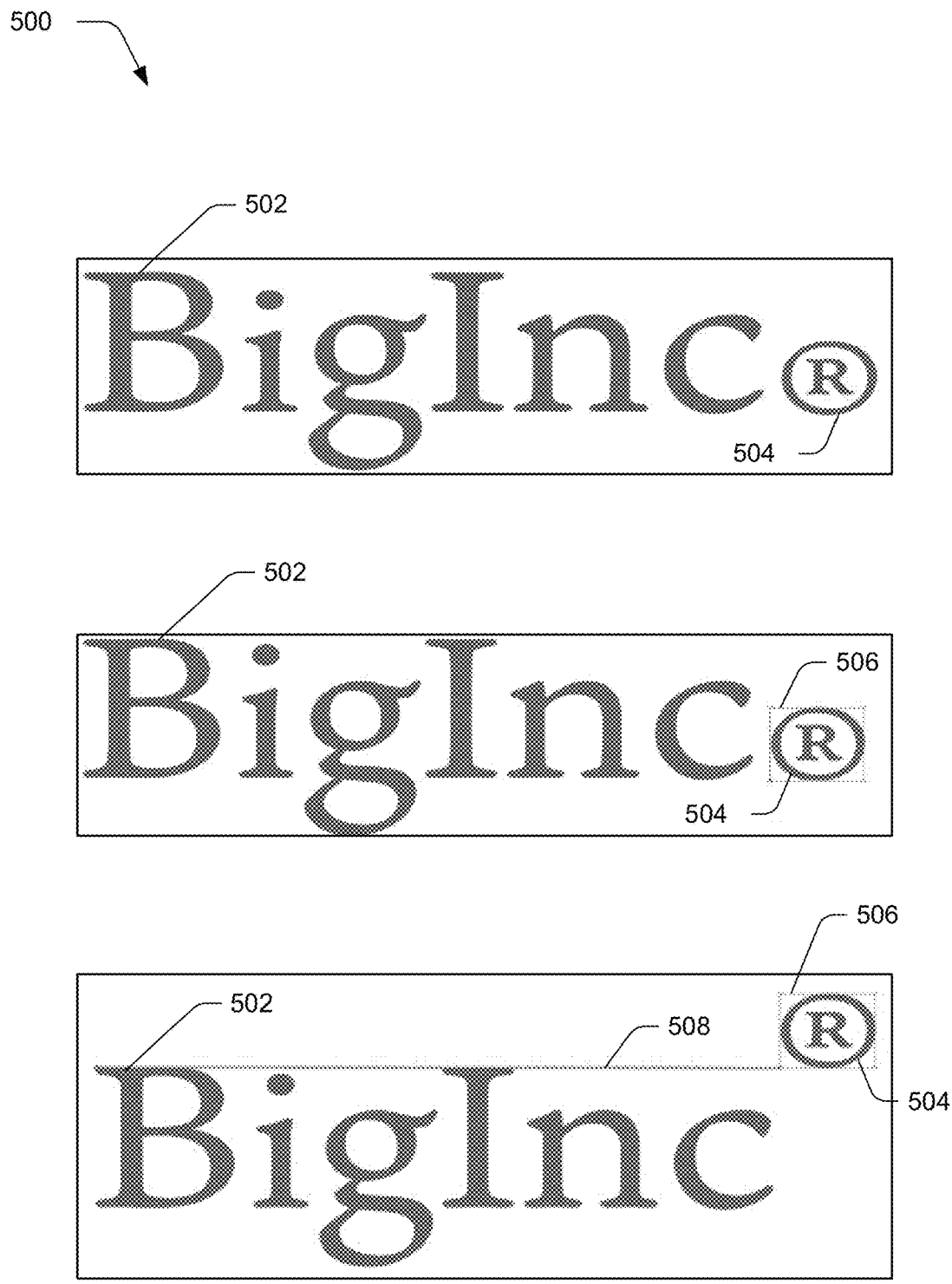
FIG. 5 is an illustration of a representation of a displacement of a single glyph relative to an object using an alignment guide.

FIG. 5 is an illustration of a representation 500 of a displacement of a single glyph relative to an object using an alignment guide. The representation 500 includes an object 502 and a single glyph 504. In the illustrated example, the object 502 includes six glyphs and the single glyph 504 is a registered trademark symbol. A bounding box 506 for the single glyph 504 is generated, e.g., the computing device 102 may implement the transformation module 110 to generate the bounding box 506 for the single glyph 504. The transformation module 110 may generate the bounding box 506 as a zero angled non-reference bounding box for the single glyph 504 and the transformation module 110 may utilize a corresponding zero angled reference bounding box for the single glyph 504 to transform the single glyph 504 as editable text.

The bounding box 506 and the single glyph 504 are vertically displaced relative to the object 502 based on the input data 116. For example, the computing device 102 may implement the transformation module 110 to map a user input defining a vertical displacement of the single glyph 504 relative to the object 502 into a baseline shift. The transformation module 110 can generate an updated bounding box 506 based on this mapping.

A potential alignment between the single glyph 504 and the object 502 is identified based on the updated bounding box 506, e.g., the potential alignment may be identified based on updated corner positions of the updated bounding box 506. For example, the transformation module 110 provides data describing the updated corner positions to a snapping module of the application for creating and/or editing the digital content 112. The transformation module 110 renders the potential alignment as an alignment guide 508 usable to guide the vertical displacement of the single glyph 504 relative to the object 502.

In the illustrated example, the alignment guide 508 is usable to precisely align a top portion of the object 502 with a bottom portion of the single glyph 504 such that the transformation of the single glyph 504 appears visually pleasing. In one example, in response to receipt of a user input, the snapping module of the application for creating and/or editing the digital content 112 can snap the single glyph 504 relative to the object 502 using the alignment guide 508. By using the corner positions of the bounding box 506 to generate the alignment guide 508 instead of converting the single glyph 504 into an outline to generate the alignment guide 508, the single glyph 504 is transformed relative to the object 502 as editable text.

Figure 6:
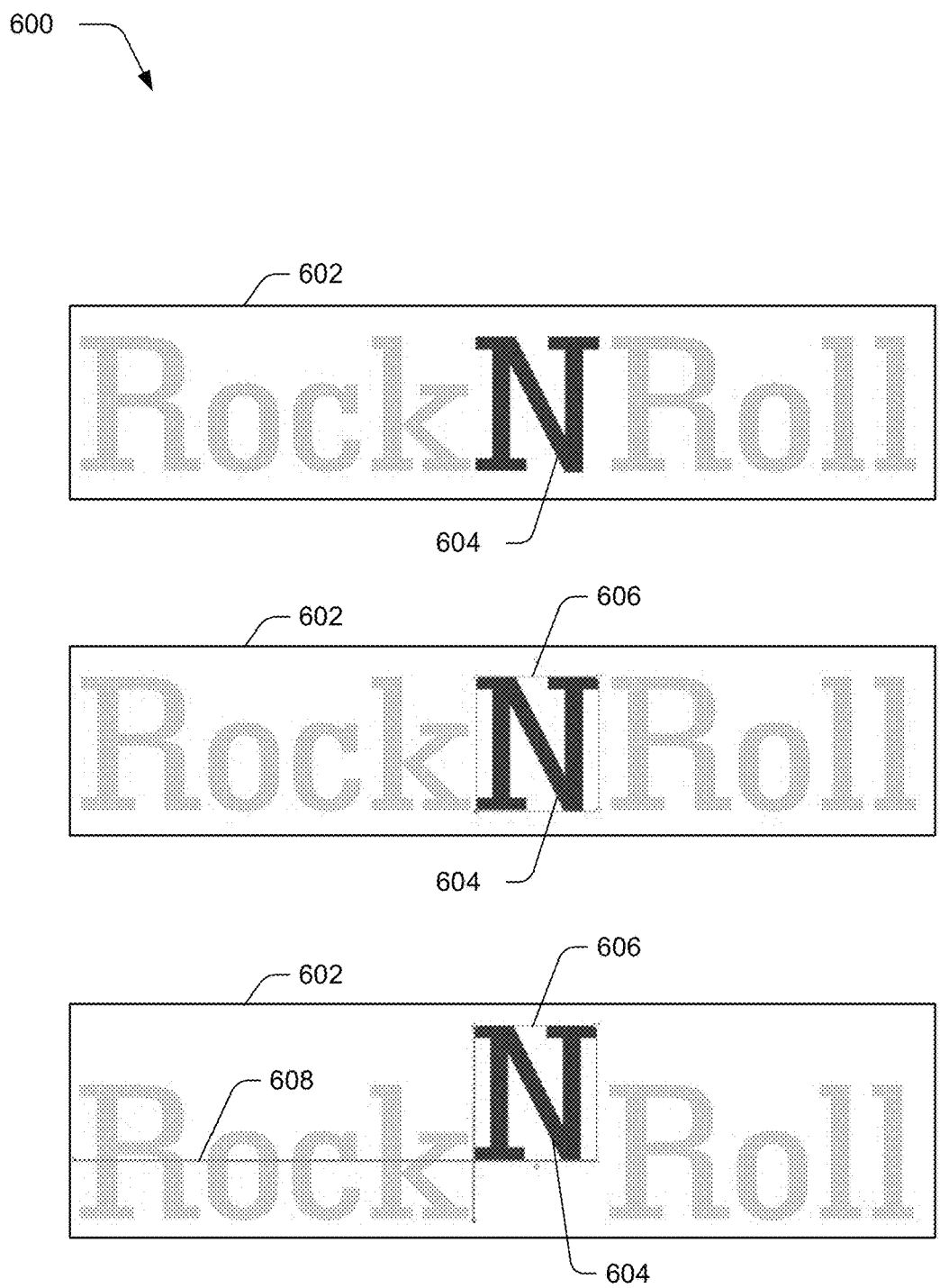
FIG. 6 is an illustration of a representation of a displacement of a single glyph of a text object within the text object using a center alignment guide.

FIG. 6 is an illustration of a representation 600 of a displacement of a single glyph of a text object within the text object using a center alignment guide. The representation 600 includes a single text object 602 which includes nine glyphs, and these nine glyphs are editable as text. A single glyph 604 of the nine glyphs of the text object 602 is also illustrated. The single glyph 604 is the letter "N" and the single glyph 604 is disposed between the other eight glyphs of the single text object 602.

The transformation module 110 generates a bounding box 606 for the single glyph 604. For example, the transformation module 110 may generate the bounding box 606 as a zero angled non-reference bounding box and the transformation module 110 can utilize a corresponding zero angled reference bounding box for the single glyph 604 to transform the single glyph 604 as editable text within the text object 602. By generating the bounding box 606 in this manner, the single text object 602 remains editable as text both before and after a transformation of the single glyph 604 within the text object 602.

The bounding box 606 and the single glyph 604 are vertically displaced within the single text object 602 based on a user input defining this transformation included in the input data 116. The transformation module 110 maps the user input into a baseline shift of the single glyph 604. The transformation module 110 also generates an updated bounding box 606 based on this mapping.

A potential alignment between the single glyph 604 and the other glyphs of the text object 602 is identified using corner positions of the updated bounding box 606. For example, the transformation module 110 can provide data describing the updated corner positions to the snapping module of the application for creating and/or editing the digital content 112. As shown, the transformation module 110 renders the identified potential alignment as a center alignment guide 608 which can be used to precisely align a portion of the single glyph 604 with portions of the other glyphs of the text object 602.

In this example, the center alignment guide 608 is used to guide an alignment between a bottom portion of the single glyph 604 and central portions of the other glyphs of the single text object 602. As a result, the transformation of the single glyph 604 within the text object 602 is precise and visually pleasing. In one example, in response to receiving a user input defining a snapping operation, the snapping module of the application for creating and/or editing the digital content 112 can snap the single glyph 604 to the other glyphs of the text object 602 using the center alignment guide 608.

Through use of corner positions of the bounding box 606 to generate the center alignment guide 608, the single glyph 604 is transformed within the text object 602 without converting the single glyph 604 or the other glyphs of the text object 602 into outlines. Thus, the single glyph 604 and the other eight glyphs are editable as the single text object 602 and these glyphs are not converted into separate text objects. In this way, the single glyph 604 is transformed within the other glyphs of the text object 602 and all nine glyphs of the text object 602 remain as editable text.

Figure 7:
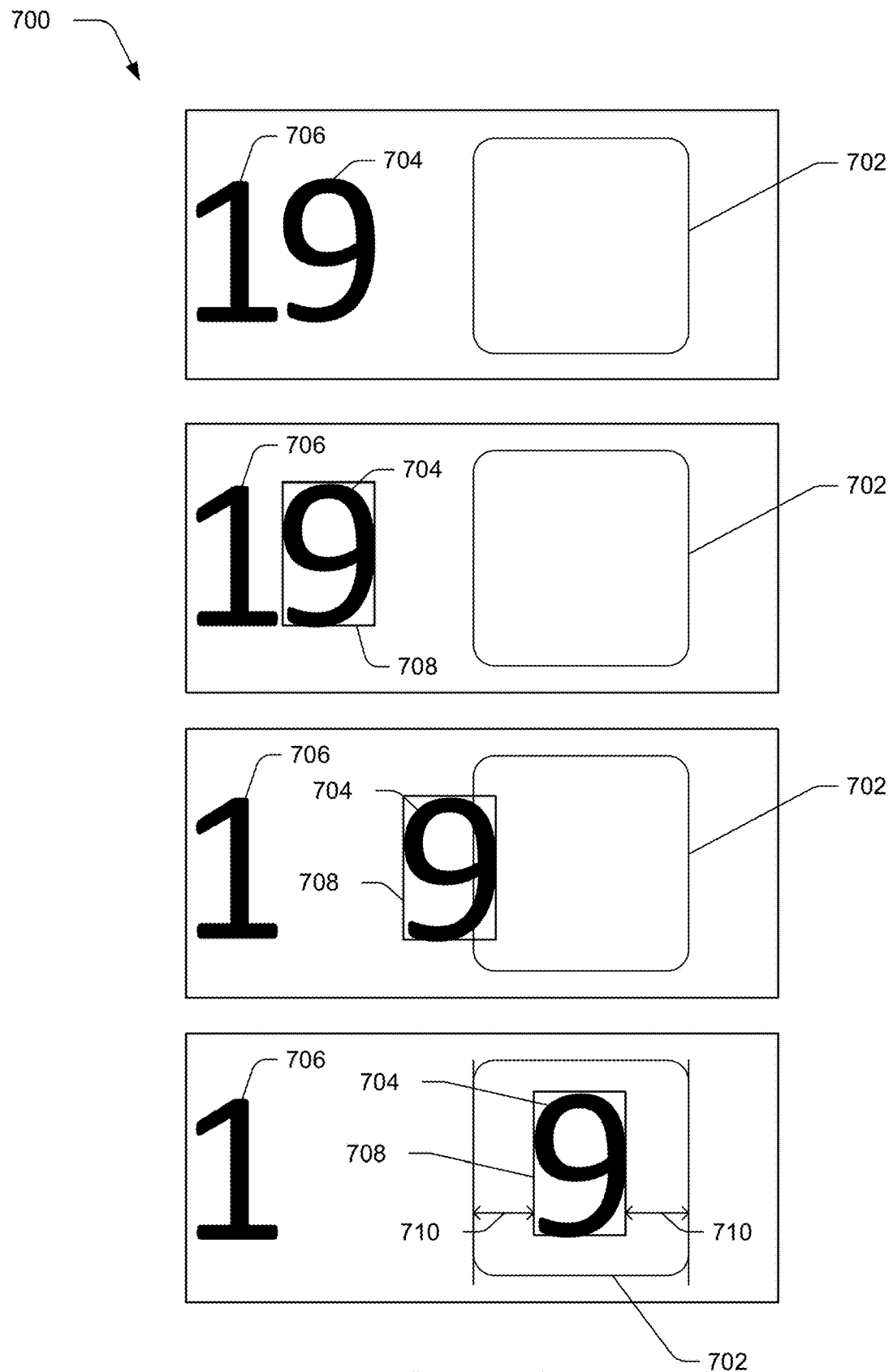
FIG. 7 is an illustration of a representation of a displacement of a single glyph relative to an object using an equal spacing guide.

FIG. 7 is an illustration of a representation 700 of a displacement of a single glyph relative to an object using an equal spacing guide. The representation 700 includes an object 702, a single glyph 704, and an additional glyph 706. As illustrated, the object 702 is a square with rounded corners, the single glyph 704 is the numeral "9," and the additional glyph 706 is the numeral "1." The computing device 102 implements the transformation module 110 to generate a bounding box 708 for the single glyph 704. For example, the transformation module 110 generates the bounding box 708 as a zero angled non-reference bounding box for the single glyph 704. In this example, the transformation module 110 can utilize the zero angled non-reference bounding box along with a corresponding zero angled reference bounding box to generate transformations of the single glyph 704 as editable text.

The bounding box 708 and the single glyph 704 are horizontally displaced relative to the object 702 and the additional glyph 706 based on data describing a user input defining this transformation included in the input data 116. The transformation module 110 maps the transformation defined in the input data 116 to a kerning space between the single glyph 704 and the additional glyph 706 to perform the horizontal displacement. The transformation module 110 also generates an updated bounding box 708 as part of the horizontal displacement and provides data describing corner positions of the updated bounding box 708 to the snapping module of the application for creating and/or editing the digital content 112.

A potential alignment of the single glyph 704 relative to the object 702 is identified based on the corner positions of the updated bounding box 708. By leveraging the corner positions of the updated bounding box 708, the transformation module 110 can identify the potential alignment without converting the single glyph 704 into an outline. In this way, the single glyph 704 retains its editability as text which would be lost if the single glyph 704 was converted into an outline to identify the potential alignment.

The transformation module 110 renders the potential alignment as an equal spacing guide 710 usable to align the single glyph 704 relative to the object 702 such that left and right sides of the bounding box 708 are spaced equally from left and right sides of the object 702, respectively. The equal spacing guide 710 is rendered as two lines having an equal length and the equal spacing guide 710 is a visual indication of an equal spacing alignment between the single glyph 704 and the object 702. For example, in response to receiving a user input defining a snapping operation, the snapping module of the application for creating and/or editing the digital content 112 can snap the single glyph 704 to the object 702 using the equal spacing guide 710.

Figure 8:
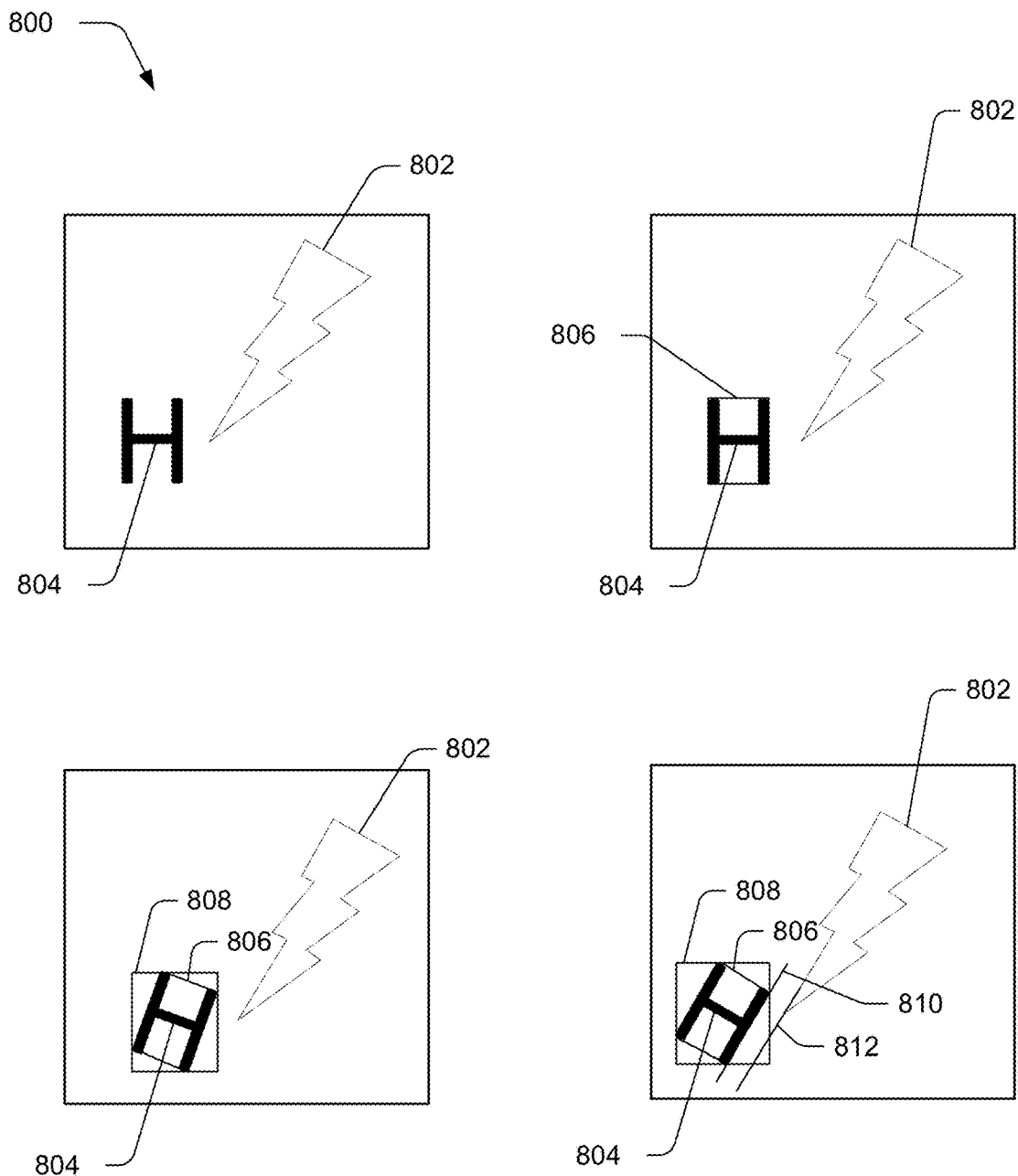
FIG. 8 is an illustration of a representation of a rotation of a single glyph relative to an object using an angle guide.

FIG. 8 is an illustration of a representation 800 of a rotation of a single glyph relative to an object using an angle guide. The representation 800 includes an object 802 and a single glyph 804. In this example, the object 802 is a lightning bolt and the single glyph 804 is the letter "H." The transformation module 110 is implemented to generate a bounding box 806 for the single glyph 804. For example, the transformation module 110 generates the bounding box 806 as a theta angled reference bounding box for the single glyph 804. The bounding box 806 and the single glyph 804 are rotated relative to the object 802 based on a user input defining this transformation included in the input data 116. The transformation module 110 maps the transformation defined in the input data 116 as a displacement angle from a center of the single glyph 804. The transformation module 110 also generates a zero angled non-reference bounding box 808 for the single glyph 804 and the transformation module 110 can utilize a corresponding zero angled reference bounding box to map the transformation of the single glyph 804 as editable text.

The transformation module 110 generates an updated bounding box 806 as part of the rotation of the single glyph 804. In one example, transformation module 110 provides angular line data describing lines parallel to the updated bounding box 806 to an angular snapping module of the application for creating and/or editing the digital content 112. The angular snapping module searches the object 802 for lines parallel to the lines described by the angular line data of the updated bounding box 806.

A potential alignment of the single glyph 804 relative to the object 802 is identified based on the angular line data describing lines parallel to the updated bounding box 806. By leveraging the angular line data based on the updated bounding box 806, the transformation module 110 identifies the potential alignment without converting the single glyph 804 into an outline. Thus, the transformation module 110 identifies the potential alignment and the single glyph 804 is transformed as editable text.

The transformation module 110 renders the potential alignment as an angle guide 810 which is usable to align the single glyph 804 relative to the object 802. The transformation module 110 also renders an alignment indication 812 which visually indicates a portion of the object 802 identified as part of identifying the potential alignment of the single glyph 804 relative to the object 802. As shown, the angle guide 810 provides a visual indication that the updated bounding box 806 is parallel to a line extending from a tip of the object 802 and the alignment indication 812 illustrates the line extending from the tip of the object 802. In an example, in response to receiving a user input defining a snapping operation, the angular snapping module of the application for creating and/or editing the digital content 112 can snap the single glyph 804 to the object 802 using the angle guide 810.

Figure 9:
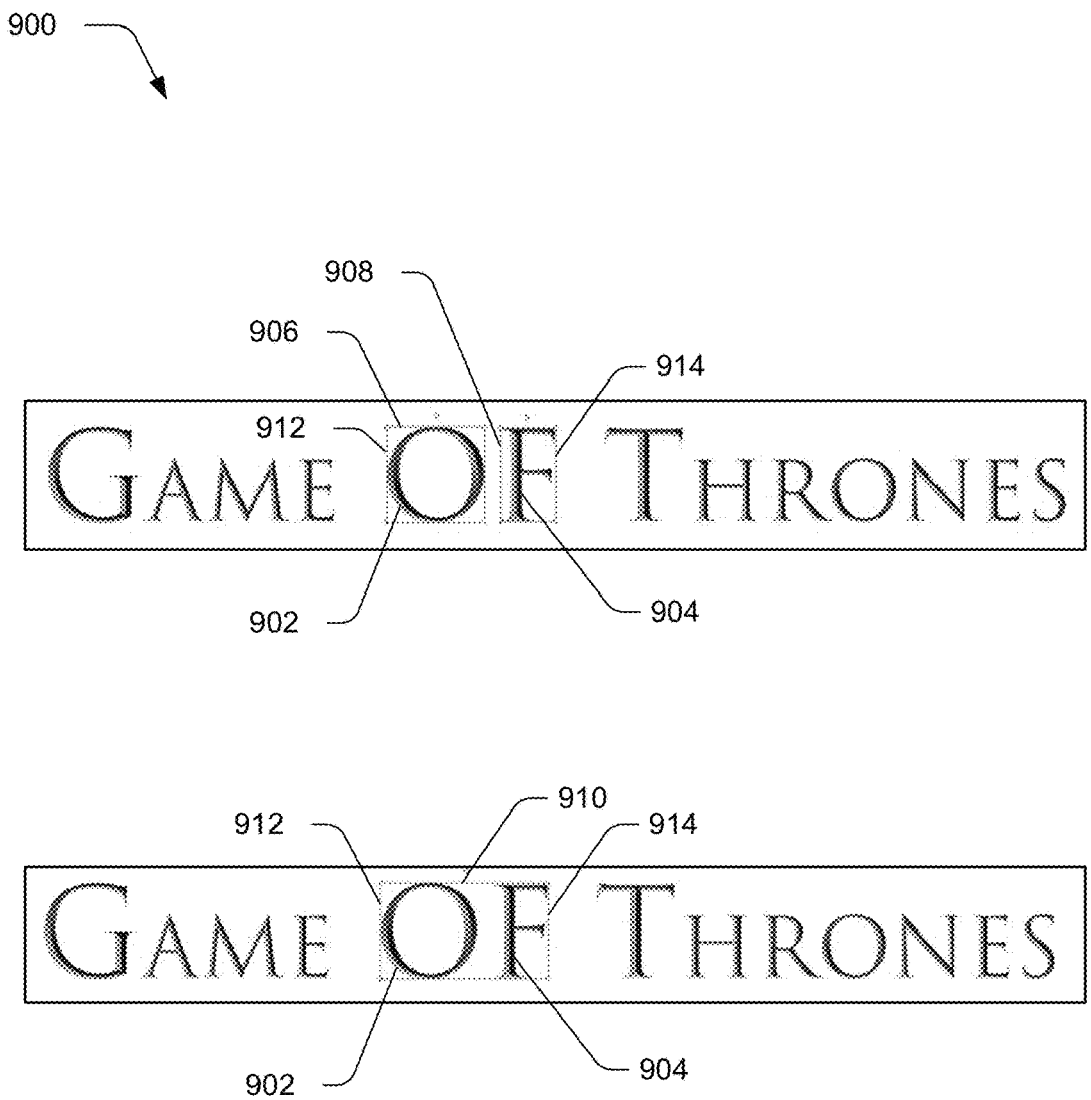
FIG. 9 is an illustration of a representation of generation of a bounding box for multiple glyphs by concatenating bounding boxes of a first glyph and a second glyph of the multiple glyphs.

FIG. 9 is an illustration of a representation 900 of generation of a bounding box for multiple glyphs by concatenating bounding boxes of a first glyph and a second glyph of the multiple glyphs. The representation 900 includes a first glyph 902 and a second glyph 904. In the illustrated example, the first glyph 902 is the letter "O" and the second glyph 904 is the letter "F." The computing device 102 implements the transformation module 110 to generate a bounding box 906 for the first glyph 902 and a bounding box 908 for the second glyph 904. For example, the transformation module 110 may generate bounding boxes 906, 908 as zero angled non-reference bounding boxes.

The transformation module 110 generates a multiple glyph bounding box 910 by concatenating the bounding box 906 of the first glyph 902 and the bounding box 908 of the second glyph 904. As shown, the transformation module 110 generates the multiple glyph bounding box 910 as having a left side 912 equal to the left side 912 of bounding box 906 because the first glyph 902 is a leftmost glyph of the glyphs 902, 904. The transformation module 110 generates the multiple glyph bounding box 910 as having a right side 914 equal to the right side 914 of bounding box 908 because the second glyph 904 is a rightmost glyph of the glyphs 902, 904.

The glyphs 902, 904 are illustrated as having a same cap height and the multiple glyph bounding box 910 is generated as having a top side equal to top sides of bounding boxes 906, 908 and as having a bottom side equal to bottom sides of bounding boxes 906, 908. It should be appreciated that in an example in which the glyphs 902, 904 have different cap heights, the transformation module 110 generates the multiple glyph bounding box 910 to have a top side equal to a greater top side of the tops sides of the bounding boxes 906, 908. Similarly, in this example, the transformation module 110 generates the multiple glyph bounding box 910 to have a bottom side equal to a lower bottom side of the bottom sides of the bounding boxes 906, 908.

As shown, the multiple glyph bounding box 910 fully envelops outlines of the first glyph 902 and the second glyph 904. By generating the multiple glyph bounding box 910 in this manner, the transformation module 110 can be implemented to generate guides for transforming the first glyph 902 and the second glyph 904 simultaneously without converting the glyphs 902, 904 into outlines. Thus, the glyphs 902, 904 can be transformed as editable text.

Figure 10:
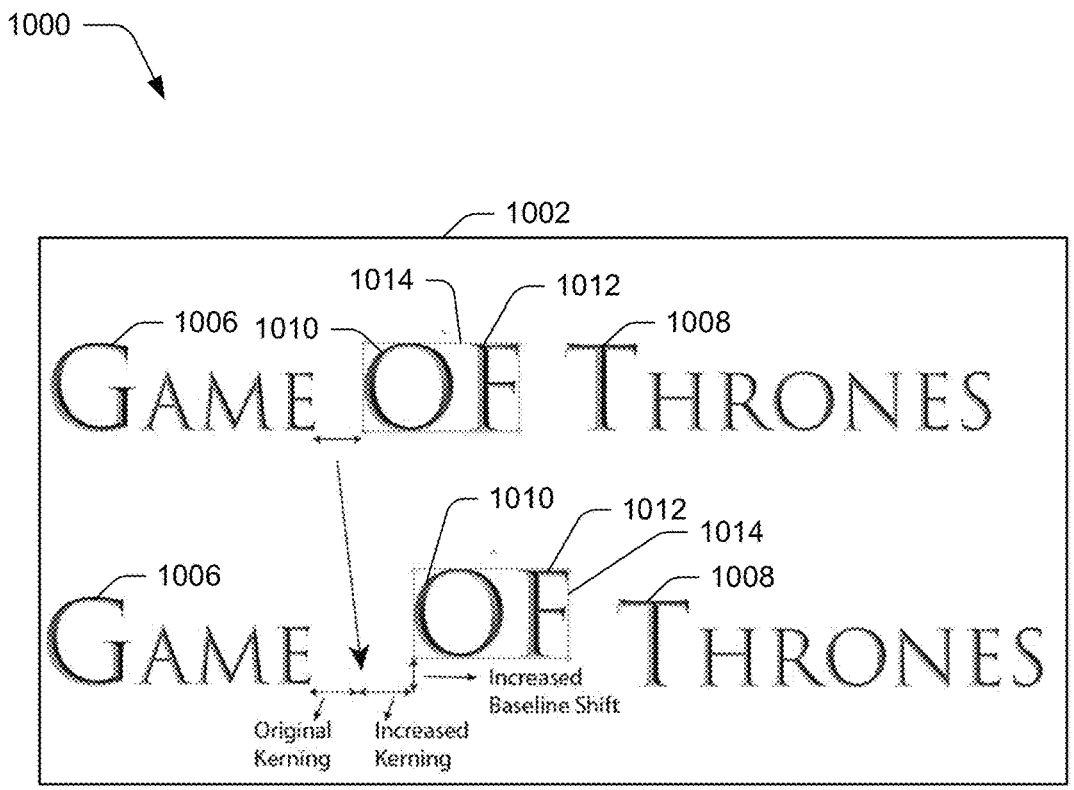
FIG. 10 is an illustration of a representation of an example of a displacement of multiple glyphs relative to objects and an example of a horizontal scaling of the multiple glyphs relative to the objects.
Figure 10:
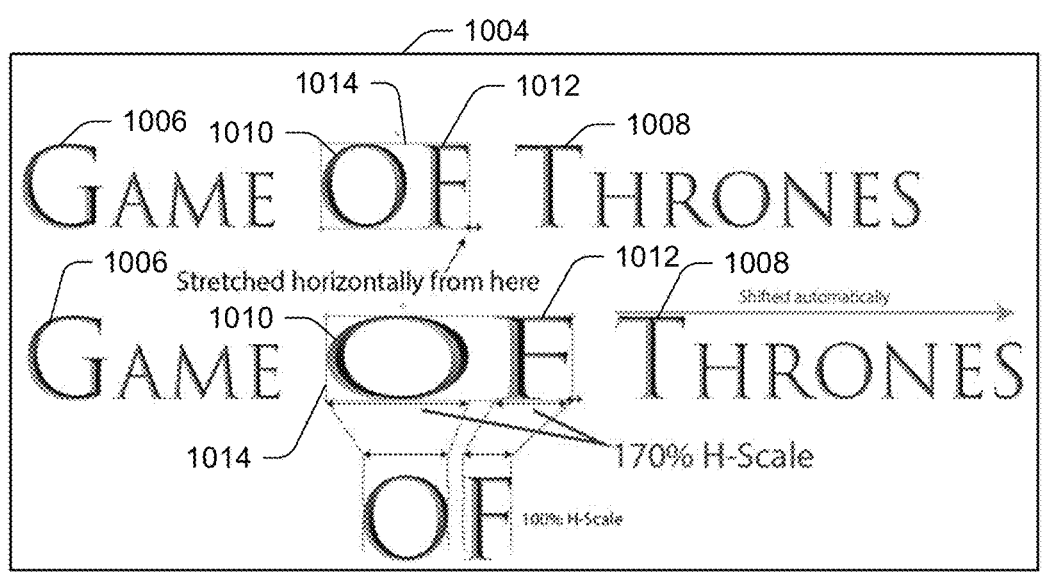

FIG. 10 is an illustration of a representation 1000 of an example 1002 of a displacement of multiple glyphs relative to objects and an example 1004 of a horizontal scaling of the multiple glyphs relative to the objects. As illustrated, the examples 1002, 1004 include a first object 1006 and a second object 1008 as well as a first glyph 1010 and a second glyph 1012. The first object 1006 includes four glyphs and the second object 1008 includes seven glyphs. The first glyph 1010 is the letter "O" and the second glyph 1012 is the letter "F" and both of the glyphs 1010, 1012 are disposed between the first object 1006 and the second object 1008.

The transformation module 110 is implemented to generate a multiple glyph bounding box 1014 for the glyphs 1010, 1012. For example, the transformation module 110 may generate a bounding box for the first glyph 1010 and a bounding box for the second glyph 1012. The transformation module 1010 then concatenates the bounding box for the first glyph 1010 and the bounding box for the second glyph 1012 as the multiple glyph bounding box 1014. The transformation module 110 receives a user input defining a transformation of the glyphs 1010, 1012. For example, the user input can be described by data included in the input data 116.

In example 1002, the transformation is a horizontal displacement and a vertical displacement of the glyphs 1010, 1012. The transformation module 110 maps the horizontal displacement in kerning and the transformation module 110 maps the vertical displacement as a baseline shift of the glyphs 1010, 1012. As shown, with kerning increased between glyph "E" of first object 1006 and the first glyph 1010, this automatically shifts the second object 1008 due to increased horizontal displacement in the text reflow direction. For example, the transformation module 110 receives the user input defining the horizontal displacement and the vertical displacement with respect to the multiple glyph bounding box 1014. The transformation module 110 maps the horizontal displacement and the vertical displacement to the glyphs 1010, 1012 to transform the glyphs 1010, 1012 as editable text.

In example 1004, the transformation is a horizontal scaling of the glyphs 1010, 1012. The transformation module 110 maps the horizontal scaling as a scale percentage onto a horizontal scale of the glyphs 1010, 1012. The transformation module 110 receives the user input defining an increase in the horizontal scale with respect to the multiple glyph bounding box 1014. The transformation module 110 maps the increase in the horizontal scale to the glyphs 1010, 1012 to transform the glyphs 1010, 1012 as editable text. In the illustrated example, the transformation module 110 shifts the second object 1008 in response to the transformation of the glyphs 1010, 1012. As shown, with increased horizontal scale, the transformation module 110 automatically displaces the second object 1008 via horizontal displacement due to automatic text reflow of the glyphs 1010, 1012.

Figure 11:
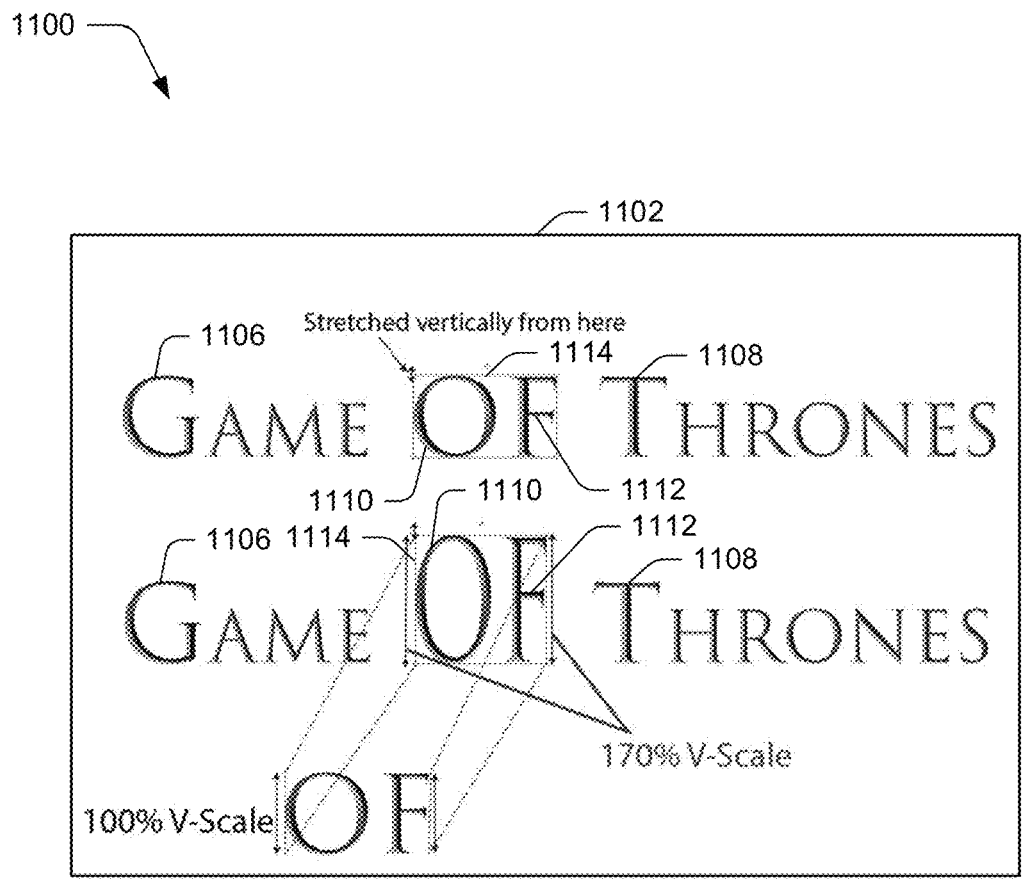
FIG. 11 is an illustration of a representation of an example of a vertical scaling of multiple glyphs relative to objects and an example of a uniform scaling of the multiple glyphs relative to the objects.
Figure 11:
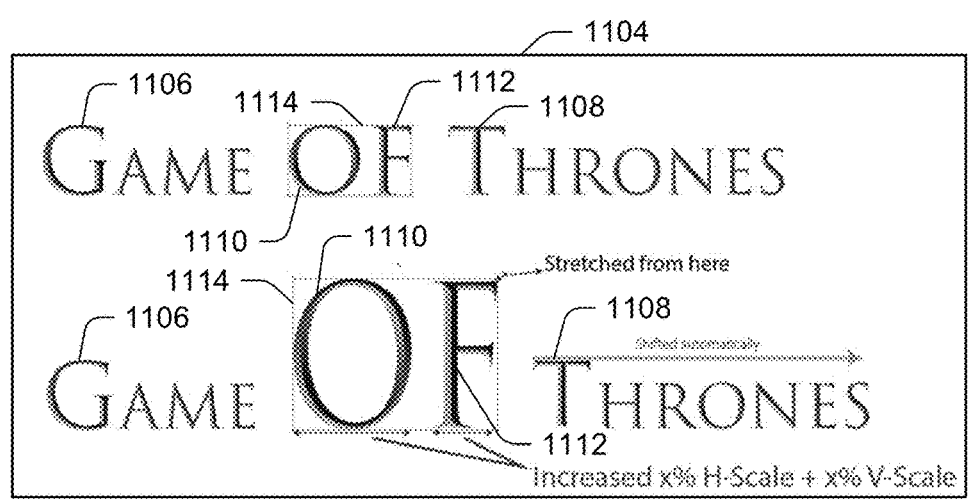

FIG. 11 is an illustration of a representation 1100 of an example 1102 of a vertical scaling of multiple glyphs relative to objects and an example 1104 of a uniform scaling of the multiple glyphs relative to the objects. The examples 1102, 1104 include a first object 1106 and a second object 1108 as well as a first glyph 1110 and a second glyph 1112. The first object 1106 includes four glyphs and the second object 1108 includes seven glyphs. The first glyph 1110 is the letter "O" and the second glyph 1112 is the letter "F" and both of the glyphs 1110, 1112 are disposed between the first object 1106 and the second object 1108.

The transformation module 110 is implemented to generate a multiple glyph bounding box 1114 for the glyphs 1110, 1112 by generating a bounding box for the first glyph 1110 and a bounding box for the second glyph 1112. The transformation module 110 then concatenates the bounding box for the first glyph 1110 and the bounding box for the second glyph 1112 as the multiple glyph bounding box 1114. The transformation module 110 receives a user input defining a transformation of the glyphs the glyphs 1110, 1112. For example, the user input can be described by data included in the input data 116 and the transformation module 110 receives the user input with respect to the multiple glyph bounding box 1114.

In example 1102, the transformation is a vertical scaling of the glyphs 1110, 1112. The transformation module 110 maps the vertical scaling as a scale percentage onto a vertical scale of the glyphs 1110, 1112. As shown, the user input defines an increase in the vertical scale with respect to the multiple glyph bounding box 1114. Thus, the transformation module 110 maps the increase in the vertical scale to the glyphs 1110, 1112 to transform the glyphs 1110, 1112 as editable text.

In example 1104, the transformation is a uniform scaling of the glyphs 1110, 1112. The transformation module 110 maps the uniform scaling as a scale percentage onto a vertical scale and a horizontal scale of the glyphs 1110, 1112. As illustrated, the user input defines an increase in the uniform scale with respect to the multiple glyph bounding box 1114. The transformation module 110 maps the increase in the uniform scale to the glyphs 1110, 1112 to transform the glyphs 1110, 1112 as editable text. In an example, the transformation module 110 shifts the second object 1108 in response to the transformation of the glyphs 1110, 1112.

Figure 12:
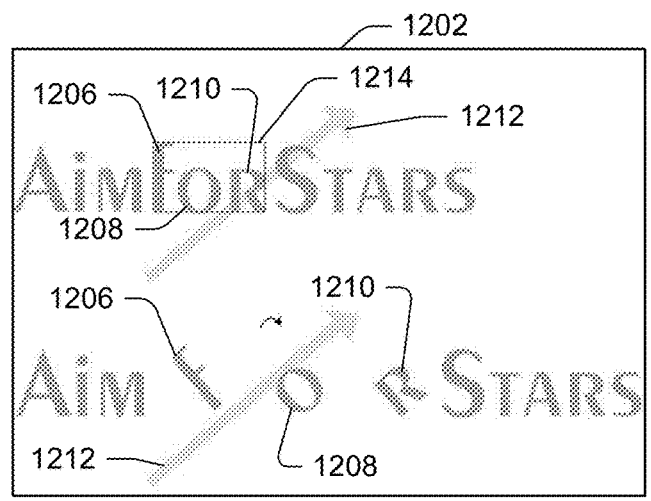
FIG. 12 is an illustration of a representation of an example of character rotation as editable text and an example of word rotation as editable text.
Figure 12:
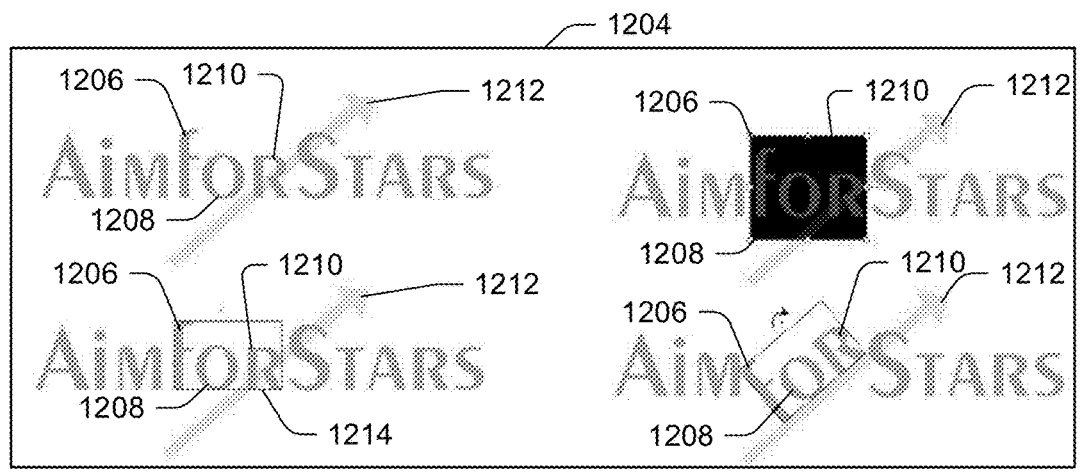

FIG. 12 is an illustration of a representation 1200 of an example 1202 of character rotation as editable text and an example 1204 of word rotation as editable text. As illustrated, the examples 1202, 1204 include glyphs 1206, 1208, 1210 and an object 1212. The computing device 102 implements the transformation module 110 to generate a multiple glyph bounding box 1214 for the glyphs 1206, 1208, 1210. To do so, the transformation module 110 generates a bounding box for each of the glyphs 1206, 1208, 1210 and the transformation module 110 concatenates these bounding boxes as the multiple glyph bounding box 1214. For example, the transformation module 110 generates a theta angled reference bounding box for each of the glyphs 1206, 1208, 1210 and the transformation module 110 concatenates the theta angled reference bounding boxes as a theta angled multiple glyph bounding box 1214.

The transformation module 110 receives a user input defining a transformation of the glyphs 1206, 1208, 1210. For example, the user input may be described by data included in the input data 116. The transformation module 110 can receive the user input with respect to the theta angled multiple glyph bounding box 1214. In examples 1202, 1204 the user input defines the transformation of the glyphs 1206, 1208, 1210 relative to the object 1212.

In example 1202, the user input defines a character rotation of the glyphs 1206, 1208, 1210 relative to the object 1212. In response to receiving the user input, the transformation module 110 generates an updated theta angled multiple glyph bounding box 1214 that is rotated based on the user input. The transformation module 110 determines an amount of rotation based on the updated theta angled multiple glyph bounding box 1214 and the transformation module 110 maps the determined amount of rotation to the glyphs 1206, 1208, 1210. To do so, the transformation module 110 maps the rotation applied to the updated theta angled multiple glyph bounding box 1214 to the theta angled bounding boxes of the glyphs 1206, 1208, 1210.

As illustrated in example 1202, the transformation module 110 can also map a vertical displacement of the glyphs 1206, 1208, 1210 by mapping a baseline shift to zero angled non-reference bounding boxes of the glyphs 1206, 1208, 1210. Similarly, the transformation module 110 can map a horizontal displacement of the glyphs 1206, 1208, 1210 to kerning by mapping the horizontal displacement to the zero angled non-reference bounding boxes of the glyphs 1206, 1208, 1210. In this manner, the transformation module 110 maps the rotation defined by the user input as a character rotation applied to the glyphs 1206, 1208, 1210 such that the glyphs 1206, 1208, 1210 are individually rotated relative to the object 1212.

In example 1204, the user input defines a word rotation of the glyphs 1206, 1208, 1210 relative to the object 1212. In response to receiving the user input, the transformation module 110 determines a transformation for the glyphs 1206, 1208, 1210 such that the glyphs 1206, 1208, 1210 are rotated relative to the object 1212 as a group. For example, the transformation module 110 determines this transformation to collectively rotate the glyphs 1206, 1208, 1210 relative to the object 1212. The transformation module 110 then determines horizontal and/or vertical displacements for each of the glyphs 1206, 1208, 1210 based on the determined transformation. The transformation module 110 maps these horizontal and/or vertical displacements to kerning and/or baseline shifts to generate the glyphs 1206, 1208, 1210 having the word rotation relative to the object 1212.

Figure 13A:
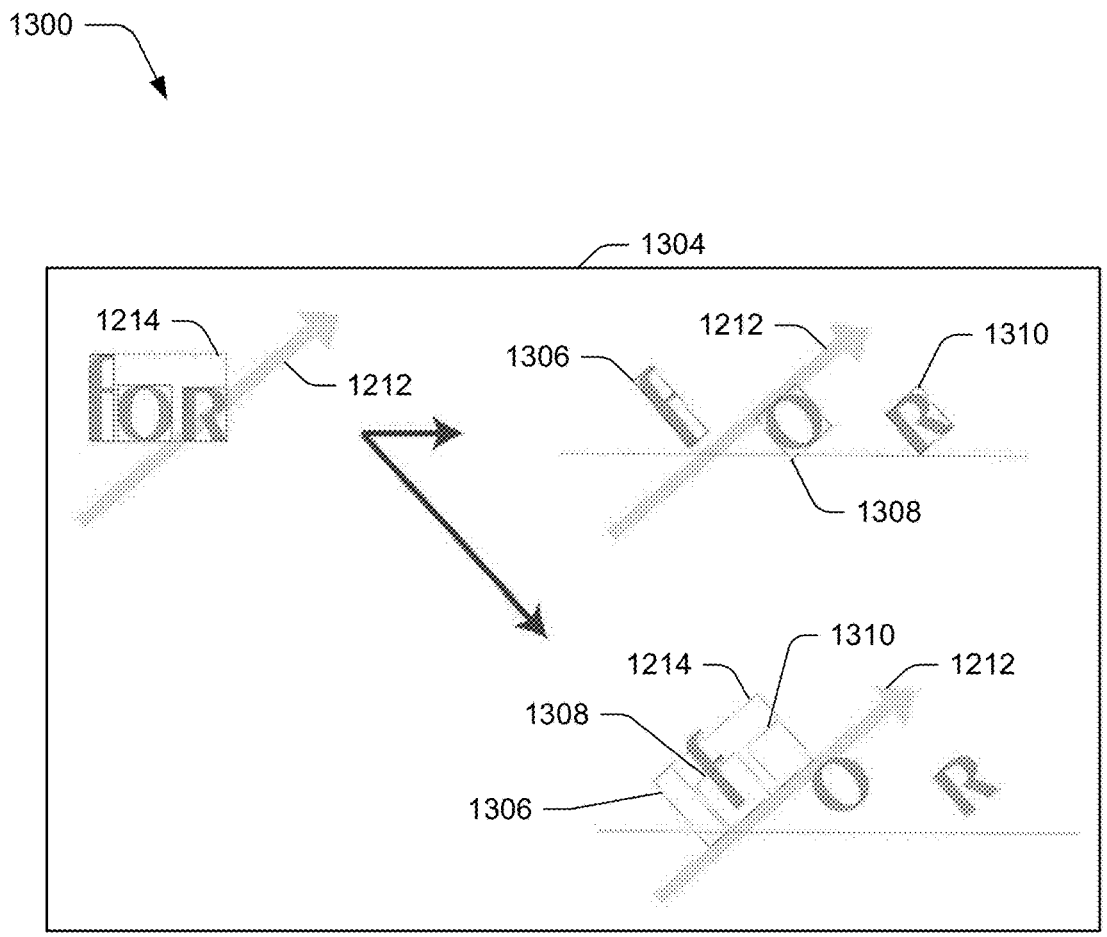
FIGS. 13A and 13B are illustrations of representations of aspects of word rotation as editable text.
Figure 13A:
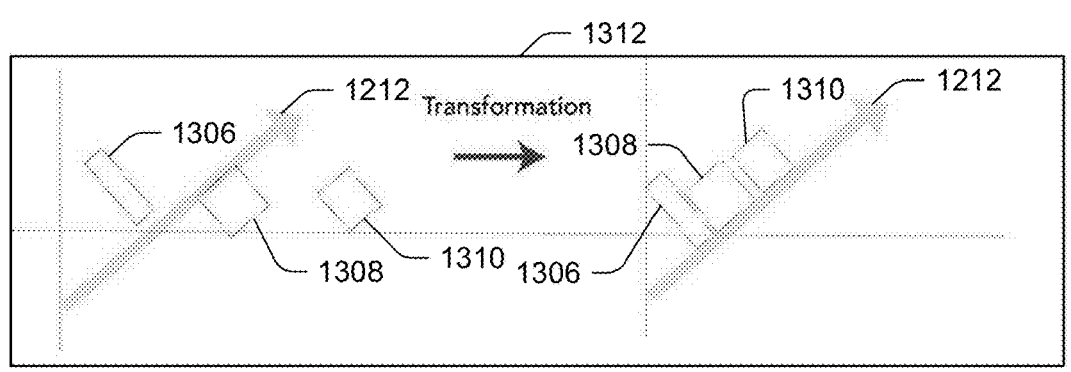
Figure 13B:
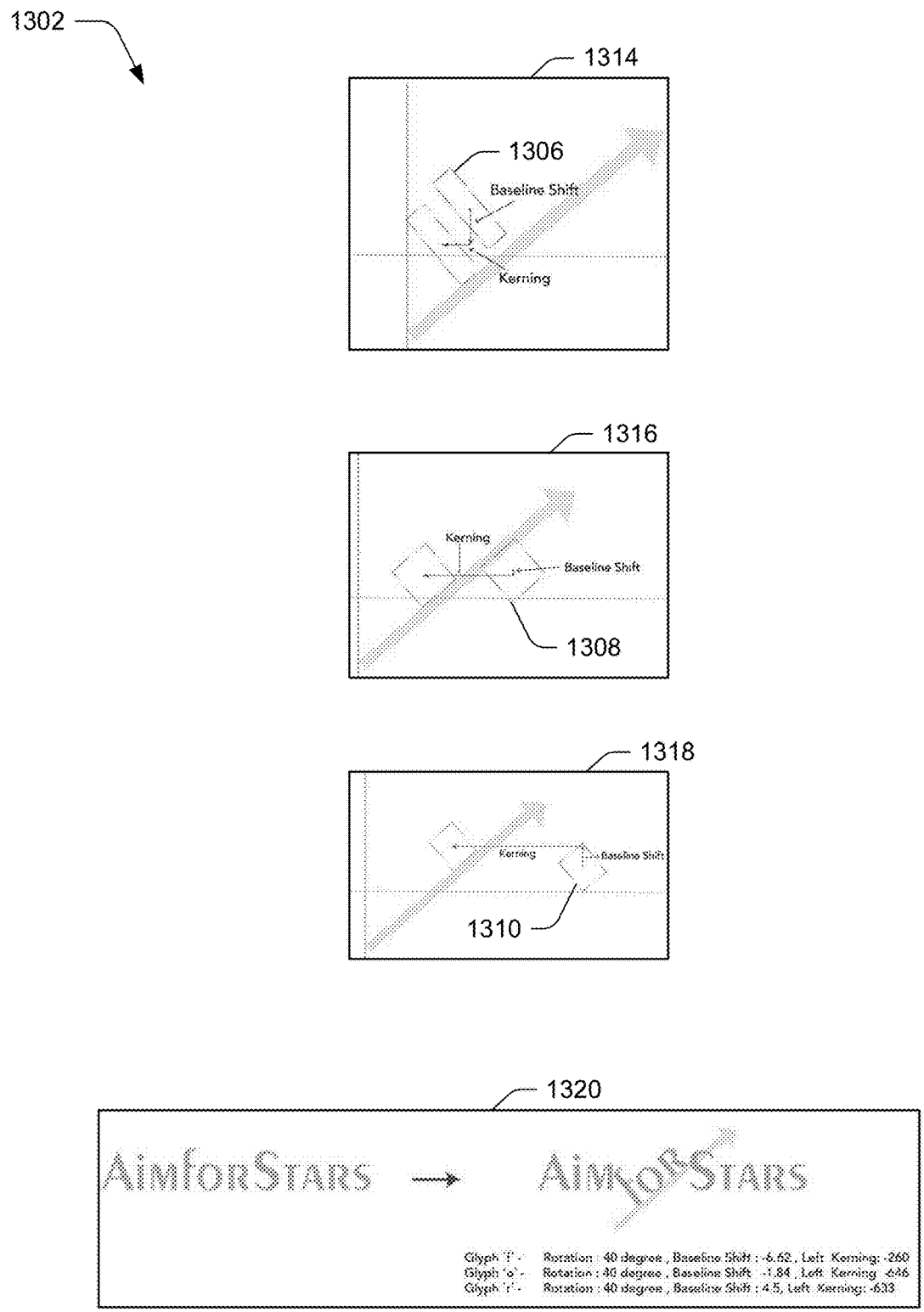

FIGS. 13A and 13B are illustrations of representations of aspects of word rotation as editable text. FIG. 13A illustrates a representation 1300 in which a transformation is determined for a word rotation. FIG. 13B illustrates a representation 1302 in which horizontal and vertical displacements are determined based on the determined transformation. Representation 1304 illustrates a mapping for word rotation. As shown, the transformation module 110 generates a zero angled non-reference bounding box for each of the glyphs 1206, 1208, 1210. The transformation module 110 then generates the multiple glyph bounding box 1214 by concatenating the zero angle non-reference bounding boxes for the glyphs 1206, 1208, 1210.

In response to receiving the user input defining the word rotation, the transformation module 110 generates theta angled reference bounding boxes 1306, 1308, 1310 having an amount of rotation defined as part of the user input. The transformation module 110 maps the theta angled reference bounding boxes 1306, 1308, 1310 to the multiple glyph bounding box 1214 and extracts an updated multiple glyph bounding box 1214 having the amount of rotation. As shown in representation 1312, the transformation module 110 determines the transformation for the glyphs 1206, 1208, 1210 such that the glyphs 1206, 1208, 1210 are rotated relative to the object 1212 as the group using the updated multiple glyph bounding box 1214 and the theta angled reference bounding boxes 1306, 1308, 1310.

Representation 1314 illustrates a vertical displacement and a horizontal displacement for glyph 1206 based on the transformation. The transformation module 110 maps the vertical displacement for glyph 1206 to kerning and the transformation module 110 maps the horizontal displacement for glyph 1206 into a baseline shift. Representation 1316 illustrates a vertical displacement and a horizontal displacement for glyph 1208 based on the transformation. As shown, the transformation module 110 maps the vertical displacement for glyph 1208 to kerning and the transformation module 110 maps the horizontal displacement for glyph 1208 into a baseline shift. Representation 1318 illustrates a vertical displacement and a horizontal displacement for glyph 1210 based on the transformation. The transformation module 110 maps the vertical displacement for glyph 1210 to kerning and the transformation module 110 maps the horizontal displacement for glyph 1210 into a baseline shift. Representation 1320 illustrates the glyphs 1206, 1208, 1210 having the word rotation transformation as editable text.

Figure 14:
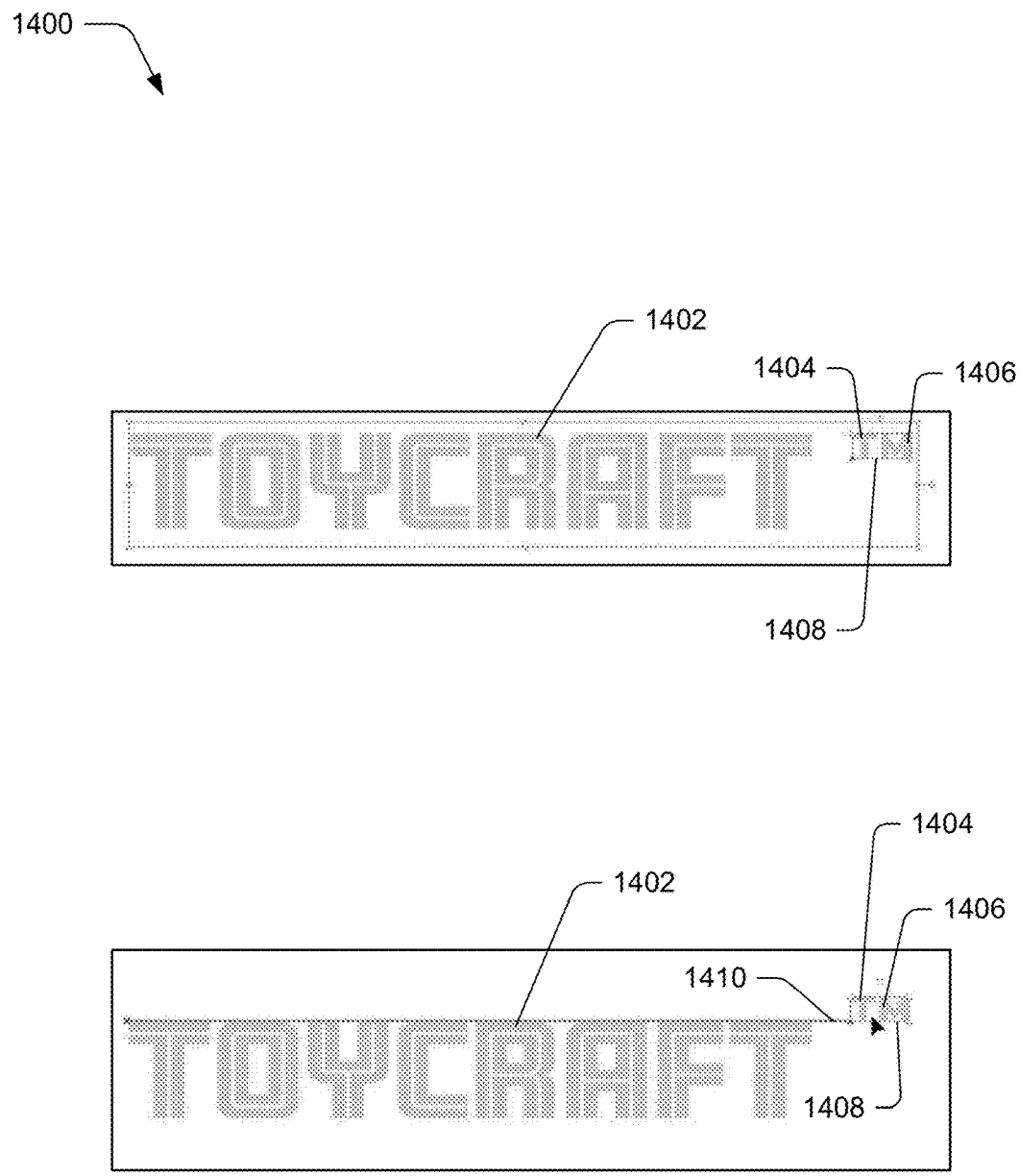
FIG. 14 is an illustration of a representation of a displacement of multiple glyphs relative to an object using an alignment guide.

FIG. 14 is an illustration of a representation 1400 of a displacement of multiple glyphs relative to an object using an alignment guide. The representation 1400 includes an object 1402, a first glyph 1404, and a second glyph 1406. As shown, the object 1402 includes eight glyphs. The first glyph 1404 is the letter "T" and the second glyph 1406 is the letter "M" in this example. A multiple glyph bounding box 1408 for the glyphs 1404, 1406 is generated, e.g., the computing device 102 may implement the transformation module 110 to generate the multiple glyph bounding box 1408 by concatenating bounding boxes of the glyphs 1404, 1406.

The multiple glyph bounding box 1408 and the glyphs 1404, 1406 are vertically displaced relative to the object 1402 based on the input data 116. For example, the input data 116 can include data describing a user input which defines a vertical displacement of the glyphs 1404, 1406 relative to the object 1402. The computing device 102 may implement the transformation module 110 to map the user input defining the vertical displacement into a baseline shift. The transformation module 110 can generate an updated multiple glyph bounding box 1408 based on this mapping.

A potential alignment between the glyphs 1404, 1406 and the object 1402 is identified based on the updated multiple glyph bounding box 1408, e.g., the potential alignment may be identified based on updated corner positions of the updated multiple glyph bounding box 1408. For example, the transformation module 110 provides data describing the updated corner positions to a snapping module of the application for creating and/or editing the digital content 112. The transformation module 110 renders the potential alignment as an alignment guide 1410 usable to guide the vertical displacement of the glyphs 1404, 1406 relative to the object 1402. In the illustrated example, the alignment guide 1410 is usable to precisely align a top portion of the object 1402 with a bottom portion of the glyphs 1404, 1406 such that the transformation of the glyphs 1404, 1406 appears visually pleasing. In one example, in response to receipt of a user input, the snapping module of the application for creating and/or editing the digital content 112 can snap the glyphs 1404, 1406 relative to the object 1402 using the alignment guide 1410.

Figure 15:
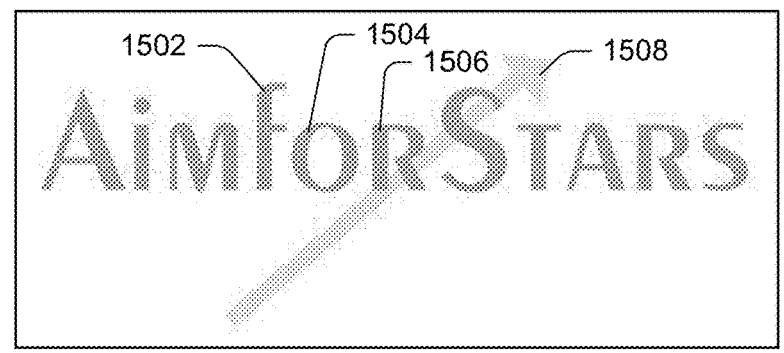
FIG. 15 is an illustration of a representation of a rotation of multiple glyphs relative to an object using an angle guide.
Figure 15:
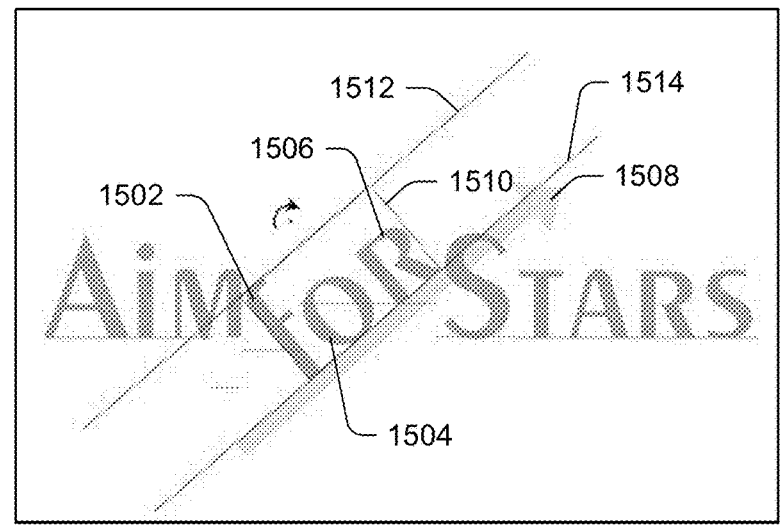

FIG. 15 is an illustration of a representation 1500 of a rotation of multiple glyphs relative to an object using an angle guide. The representation 1500 includes glyphs 1502, 1504, 1506 and an object 1508. The transformation module 110 is implemented to generate a multiple glyph bounding box 1510 for the glyphs 1502, 1504, 1506. For example, the transformation module 110 generates the multiple glyph bounding box 1510 by concatenating bounding boxes of the glyphs 1502, 1504, 1506. The multiple glyph bounding box 1510 and the glyphs 1502, 1504, 1506 are rotated relative to the object 1508 based on a user input defining this transformation included in the input data 116. The transformation module 110 maps the transformation defined in the input data 116 as a word rotation for the glyphs 1502, 1504, 1506.

The transformation module 110 generates an updated multiple glyph bounding box 1510 as part of the word rotation of the glyphs 1502, 1504, 1506. In one example, transformation module 110 provides angular line data describing lines parallel to the updated multiple glyph bounding box 1510 to an angular snapping module of the application for creating and/or editing the digital content 112. The angular snapping module searches the object 1508 for lines parallel to the lines described by the angular line data of the updated multiple glyph bounding box 1510.

A potential alignment of the glyphs 1502, 1504, 1506 relative to the object 1508 is identified based on the angular line data describing lines parallel to the updated multiple glyph bounding box 1510. By leveraging the angular line data based on the updated multiple glyph bounding box 1510, the transformation module 110 identifies the potential alignment without converting the glyphs 1502, 1504, 1506 into outlines. Thus, the transformation module 110 identifies the potential alignment and the glyphs 1502, 1504, 1506 are transformed as editable text.

The transformation module 110 renders the potential alignment as an angle guide 1512 which is usable to align the glyphs 1502, 1504, 1506 relative to the object 1508. The transformation module 110 also renders an alignment indication 1454 which visually indicates a portion of the object 1508 identified as part of identifying the potential alignment of the glyphs 1502, 1504, 1506 relative to the object 1508. As shown, the angle guide 1512 provides a visual indication that the updated multiple glyph bounding box 1510 is parallel to a line extending from a base of the object 1508 and the alignment indication 1514 illustrates the line extending from the base of the object 1508. In an example, in response to receiving a user input defining a snapping operation, the angular snapping module of the application for creating and/or editing the digital content 112 can snap the glyphs 1502, 1504, 1506 to the object 1508 using the angle guide 1512.

Example System and Device

Figure 16:
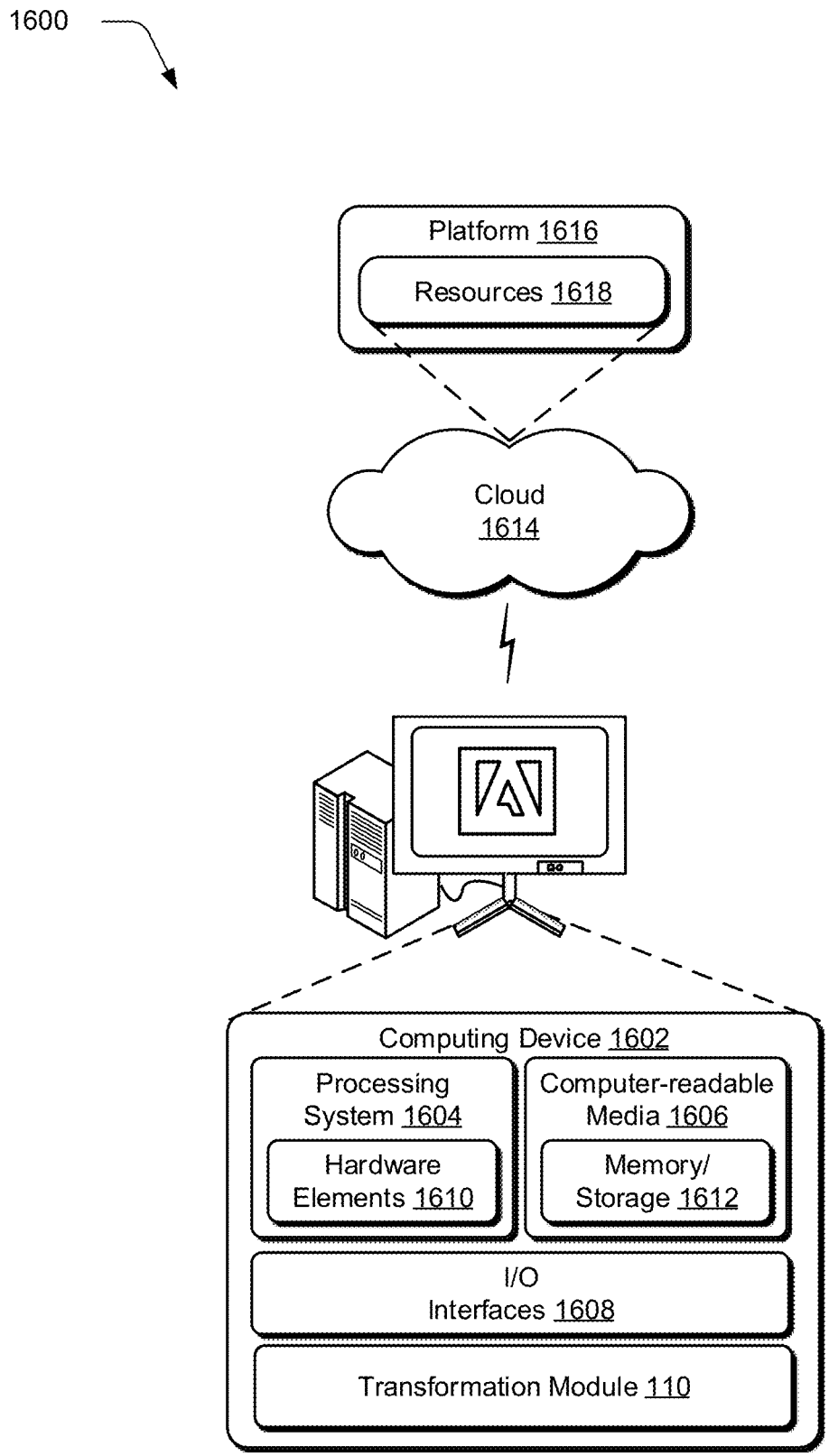
FIG. 16 illustrates an example system that includes an example computing device that is representative of one.

FIG. 16 illustrates an example system 1600 that includes an example computing device that is representative of one or more computing systems and/or devices that may implement the various techniques described herein. This is illustrated through inclusion of the transformation module 110. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interfaces 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware elements 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources 1618 and functions to connect the computing device 1602 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

CONCLUSION

Although implementations of glyph transformations as editable text have been described in language specific to structural features and/or methods, it is to be understood that the appended claims are not necessarily limited to the specific features or methods described. Rather, the specific features and methods are disclosed as example implementations of glyph transformations as editable text, and other equivalent features and methods are intended to be within the scope of the appended claims. Further, various different examples are described and it is to be appreciated that each described example can be implemented independently or in connection with one or more other described examples.

What is claimed is:
1. In a digital medium environment to transform multiple glyphs as editable text relative to an object, a method implemented by a computing device, the method comprising:
  generating, by the computing device, bounding boxes for a first glyph and a second glyph of the multiple glyphs;

generating, by the computing device, a multiple glyph bounding box for the multiple glyphs by concatenating the bounding boxes for the first and second glyphs;

receiving, by the computing device, a user input defining a transformation of the multiple glyph bounding box relative to the object;

determining, by the computing device, a mapping of the transformation of the multiple glyph bounding box to the bounding boxes for the first and second glyphs; and generating, for display in a user interface, the multiple glyphs as the editable text having the transformation based on the mapping.

2. The method as described in claim 1, wherein the transformation is a rotation of the multiple glyphs relative to the object.

3. The method as described in claim 1, wherein the transformation is a displacement of the multiple glyphs relative to the object.

4. The method as described in claim 1, wherein the transformation is a scaling of the multiple glyphs relative to the object.

5. The method as described in claim 1, further comprising rendering an indication in the user interface as a guide for the transformation.

6. The method as described in claim 5, wherein the guide is an alignment guide rendered in the user interface as a line parallel to a portion of an object.

7. The method as described in claim 6, wherein the alignment guide is an angle alignment guide.

8. The method as described in claim 5, wherein the guide is an equal spacing guide rendered in the user interface as a pair of lines having an equal length.

9. In a digital medium environment to transform multiple glyphs as editable text relative to an object, a system comprising:

a generation module implemented at least partially in hardware of a computing device to:
 generate bounding boxes for a first glyph and a second glyph of the multiple glyphs; and
 generate a multiple glyph bounding box for the multiple glyphs by concatenating the bounding boxes for the first and second glyphs;

a mapping module implemented at least partially in the hardware of the computing device to:
 receive a user input defining a transformation of the multiple glyph bounding box relative to the object; and
 determine a mapping of the transformation of the multiple glyph bounding box to the bounding boxes for the first and second glyphs; and a rendering module implemented at least partially in the hardware of the computing device to generate the multiple glyphs as the editable text having the transformation.

10. The system as described in claim 9, further comprising a guide module implemented at least partially in the hardware of the computing device to:
 calculate positions of corners of the multiple glyph bounding box; and
 generate an indication for display in a user interface as a guide for the transformation of the multiple glyphs based on the positions of the corners.

11. The system as described in claim 10, wherein the guide is an alignment guide generated for display in the user interface as a line parallel to a portion of an object.

12. The system as described in claim 11, wherein the alignment guide is an angle alignment guide.

13. The system as described in claim 10, wherein the guide is an equal spacing guide generated for display in the user interface as a pair of lines having an equal length.

14. The system as described in claim 9, wherein the transformation is a rotation of the multiple glyphs relative to the object.

15. The system as described in claim 9, wherein the transformation is a scaling of the multiple glyphs relative to the object.

16. The system as described in claim 9, wherein the transformation is a displacement of the multiple glyphs relative to the object.

17. One or more computer-readable storage media comprising instructions stored thereon that, responsive to execution by a computing device in a digital medium environment to transform multiple glyphs as editable text relative to an object, cause operations of the computing device including:

generating a first bounding box for a first glyph and a second bounding box for a second glyph of the multiple glyphs, the first bounding box enveloping an outline of the first glyph and the second bounding box enveloping an outline of the second glyph;

generating a multiple glyph bounding box for the multiple glyphs by concatenating the first bounding box and the second bounding box;

receiving a user input defining a transformation of the multiple glyph bounding box relative to the object;

determining a mapping of the transformation of the multiple glyph bounding box to the first bounding box and the second bounding box; and generating, for display in a user interface, the multiple glyphs as the editable text having the transformation relative to the object based on the mapping.

18. The one or more computer-readable storage media as described in claim 17, wherein the transformation is a rotation of the multiple glyphs relative to the object.

19. The one or more computer-readable storage media as described in claim 17, wherein the transformation is a displacement of the multiple glyphs relative to the object.

20. The one or more computer-readable storage media as described in claim 17, wherein the transformation is a scaling of the multiple glyphs relative to the object.

* * * * *